United States Patent
Garg et al.

(10) Patent No.: US 9,654,593 B2
(45) Date of Patent: May 16, 2017

(54) DISCOVERING SIGNATURE OF ELECTRONIC SOCIAL NETWORKS

(71) Applicant: International Business Machines Corporation, Armonk, NY (US)

(72) Inventors: Dinesh Garg, Beawar (IN); Ramasuri Narayanam, Andra Pradesh (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 13/779,321

(22) Filed: Feb. 27, 2013

(65) Prior Publication Data
US 2014/0143332 A1    May 22, 2014

Related U.S. Application Data

(63) Continuation of application No. 13/682,415, filed on Nov. 20, 2012.

(51) Int. Cl.
*G06F 15/16* (2006.01)
*H04L 29/08* (2006.01)
*H04W 4/20* (2009.01)

(52) U.S. Cl.
CPC ............ *H04L 67/306* (2013.01); *H04W 4/206* (2013.01)

(58) Field of Classification Search
CPC ... G06Q 10/10; H04L 29/06; H04L 29/08072; H04L 29/06027; H04L 12/581; H04L 29/08576; H04L 29/0809; H04L 29/06537
USPC ........................................................ 709/204
See application file for complete search history.

(56) References Cited

U.S. PATENT DOCUMENTS

| 8,478,735 | B1 * | 7/2013 | Archambault .... | G06F 17/30864 |
| | | | | 707/711 |
| 2007/0226248 | A1 * | 9/2007 | Darr ....................... | G06Q 10/10 |
| 2008/0070209 | A1 | 3/2008 | Zhuang et al. | |
| 2009/0281851 | A1 | 11/2009 | Newton et al. | |

(Continued)

OTHER PUBLICATIONS

Wei Chen et al., Scalable Influence Maximization for Prevalent Viral Marketing in Large-Scale Social Networks, Jul. 25-28, 2010, 10 pages.

(Continued)

*Primary Examiner* — Mahran Abu Roumi
(74) *Attorney, Agent, or Firm* — James L. Baudino

(57) ABSTRACT

Methods may rank one user's connections in an electronic social network. The method may include identifying, by electronic apparatus, one user's connections with other users in an electronic social network. The method may additionally include analyzing, by electronic apparatus, a plurality of data sources for electronic communications between the one user and the other users. The method may further include calculating, by electronic apparatus, for each of the other users the probability that the one user will communicate with that other user based on the analyzed plurality of data sources. The method may additionally include ranking, by electronic apparatus, the one user's connections with the other users based on the calculated probabilities. In some embodiments, the method may include removing from a graph, by electronic apparatus, one or more of the one user's connections with the other users based on the ranked one user's connections.

12 Claims, 10 Drawing Sheets

(56) References Cited

U.S. PATENT DOCUMENTS

| | | | | |
|---|---|---|---|---|
| 2010/0077077 | A1* | 3/2010 | Devitt | H04L 12/2602 709/224 |
| 2010/0125507 | A1* | 5/2010 | Tarantino, III | G06F 17/30867 705/14.69 |
| 2010/0268830 | A1* | 10/2010 | McKee | G06Q 10/10 709/228 |
| 2011/0125574 | A1 | 5/2011 | Pfeffer et al. | |
| 2011/0252121 | A1 | 10/2011 | Borgs et al. | |
| 2012/0036080 | A1 | 2/2012 | Singer et al. | |
| 2012/0041907 | A1* | 2/2012 | Wang | G06Q 30/02 706/12 |
| 2012/0191777 | A1* | 7/2012 | Iwasaki | G06Q 10/10 709/204 |
| 2012/0259919 | A1* | 10/2012 | Yan | G06Q 30/02 709/204 |
| 2012/0300698 | A1* | 11/2012 | Lindner | H04W 4/08 370/328 |
| 2013/0103758 | A1* | 4/2013 | Alison | G06Q 50/01 709/204 |
| 2013/0212173 | A1* | 8/2013 | Carthcart | G06Q 50/01 709/204 |
| 2013/0226912 | A1* | 8/2013 | Agapiev | G06F 17/30 707/723 |
| 2014/0075275 | A1* | 3/2014 | Aleksandrovsky | G06F 17/2229 715/202 |

OTHER PUBLICATIONS

Yuanyuan Tian et al., Efficient Aggregation for Graph Summarization, Jun. 9-12, 2008, 13 pages.

Saket Navlakha et al., Graph Summarization with Bounded Error, Jun. 9-12, 2008, 13 pages.

Michael Mathioudakis et al., Sparsification of Influence Networks, Aug. 21-24, 2011, 9 pages.

Venu Satuluri et al., Local Graph Sparsification for Scalable Clustering, Jun. 12-16, 2011, 12 pages.

Amit Goyal et al., A Data-Based Approach to Social Influence Maximization, Aug. 27-31, 2012, 12 pages.

Hady W. Lauw et al., Mining Social Network from Spatio-Temporal Events, 2005, 12 pages.

* cited by examiner

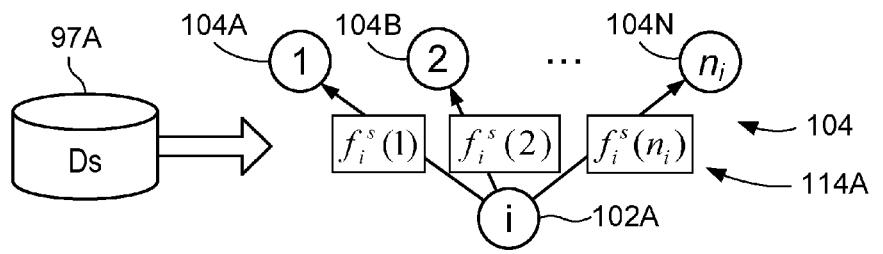
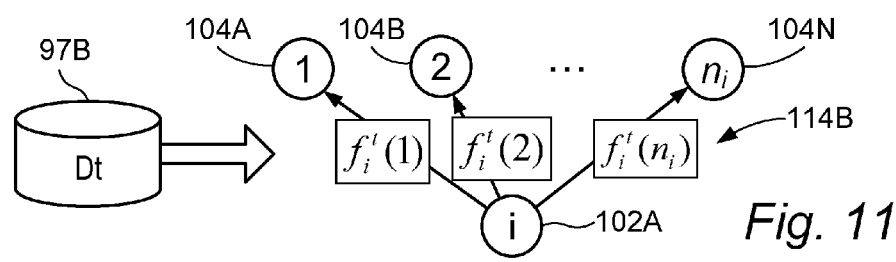
Fig. 11
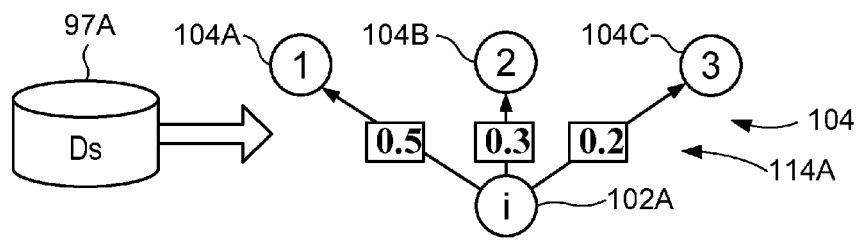
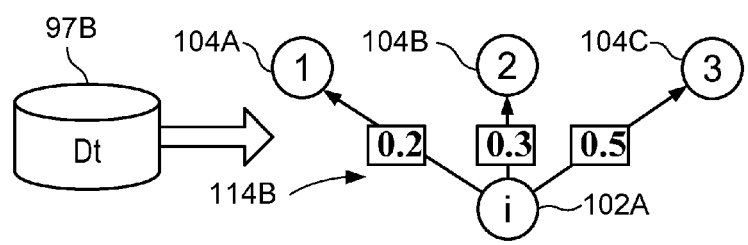
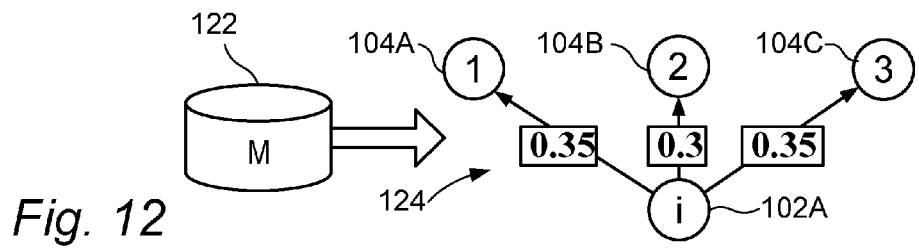
Fig. 12

DISCOVERING SIGNATURE OF ELECTRONIC SOCIAL NETWORKS

CROSS-REFERENCE TO RELATED APPLICATION

This application is a continuation of U.S. patent application Ser. No. 13/682,415, filed Nov. 20, 2012, which is incorporated herein by reference in its entirety for all purposes.

BACKGROUND

The present inventions relate to social network analysis systems, and more particularly to methods that rank user's connections in electronic social networks and/or generate signature graphs of those networks based on the ranked connections.

An electronic social network is a virtual community of interconnected users. Users may establish connections with other users and share information by, for example, sending messages and/or publishing announcements via shared connections. A service provider hosting a social network may track, for example, data about users, messages transmitted between users, and/or link structure to gain insight about the network system, cultural trends, marketing data, and/or interest in goods and services. Networks may have millions of users and connections between users and may include large amounts of data about link structure and user activity.

SUMMARY

According to one embodiment, a method may include identifying, by an electronic apparatus, one user's connections with other users in an electronic social network. The method may additionally include analyzing, by the electronic apparatus, a plurality of data sources for electronic communications between the one user and the other users. The method may further include calculating, by the electronic apparatus, for each of the other users the probability that the one user will communicate with that other user based on the analyzed plurality of data sources. The method may additionally include ranking, by the electronic apparatus, the one user's connections with the other users based on the calculated probabilities.

BRIEF DESCRIPTION OF THE DRAWINGS

FIG. 11 is a block diagram of an example of data sources and associated induced probability distributions for a given user and connected neighbors of that user in accordance with the principles of the present inventions.

FIG. 12 is a block diagram of an example of data sources, probability distributions for a given user and connected neighbors induced from the data sources, and a hypothetical probability distribution derived from induced data sources in accordance with the principles of the present inventions.

DETAILED DESCRIPTION

Figure 1:
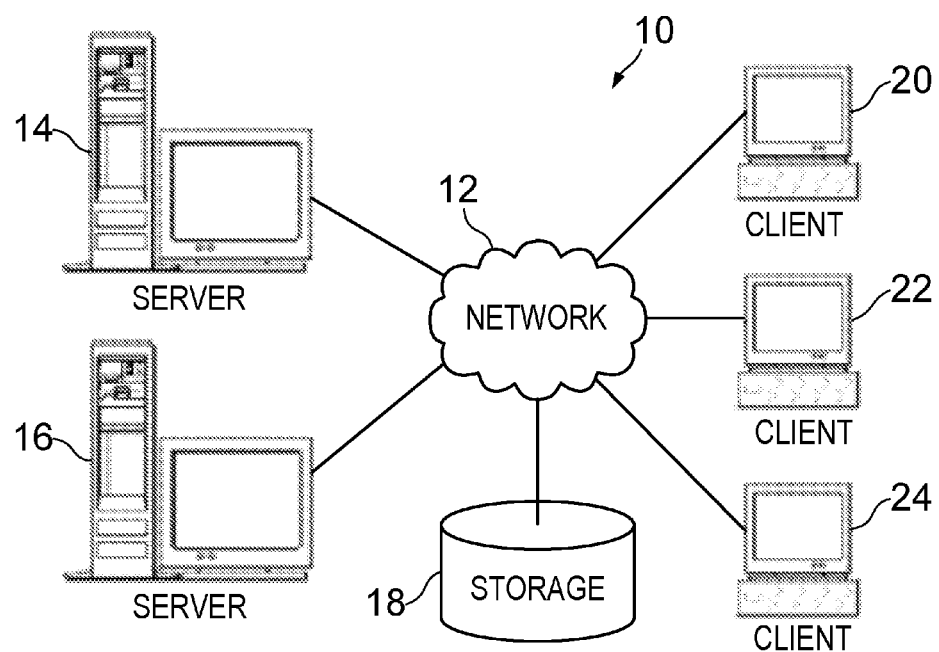
FIG. 1 is a pictorial representation of an example of a computer system in which illustrative embodiments may be implemented.

As will be appreciated by one skilled in the art, aspects of the present inventions may be embodied as a system, method, or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present inventions may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventions are described below with reference to flowchart illustrations and/or block diagrams of methods, apparatus (systems) and computer program products according to embodiments of the inventions. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Figure 2:
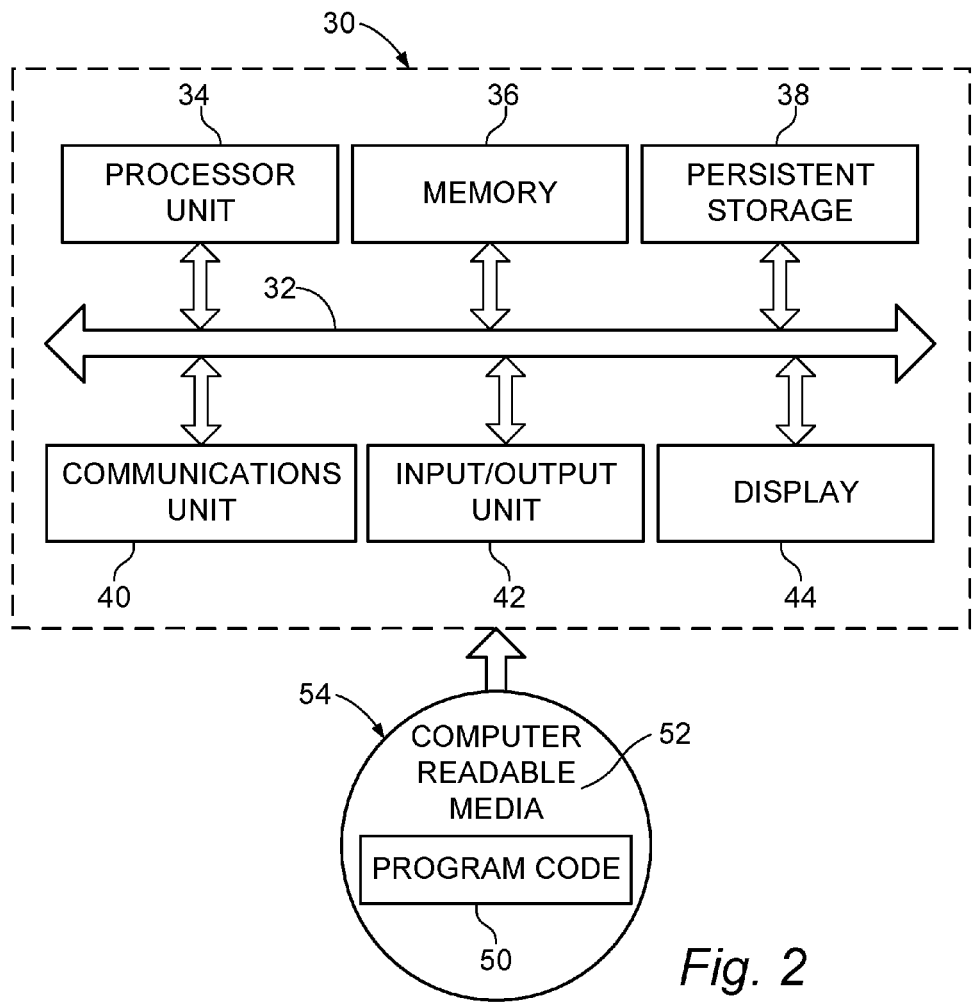
FIG. 2 is a block diagram of an example of a computer in which illustrative embodiments may be implemented.

With reference now to the figures and in particular to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

The flowcharts and block diagrams in the figures illustrate the architecture, functionality, and operation of possible implementations of systems, methods and computer program products according to various embodiments of the present inventions. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 depicts a pictorial representation of a computer system, indicated generally at 10, and including a network of computers in which illustrative embodiments may be implemented. Computer system 10 may contain a network 12, which is the medium used to provide communications links between various devices and computers connected together within computer system 10. Network 12 may include connections, such as wire, wireless communication links, or fiber optic cables, or combinations of such connections.

In the depicted example, a server 14 and a server 16 may connect to network 12 along with a storage unit 18. In addition, one or more client computers may connect to network 12, such as a first client computer 20, a second client computer 22, and a third client computer 24. Client computers 20, 22, and 24 may be, for example, personal computers work stations, or network computers. In the depicted example, server 14 may provide data, such as boot files, operating system images, and/or software applications to client computers 20, 22, and 24. Client computers 20, 22, and 24 are clients to server 14 in this example. Computer system 10 may include additional servers, clients, and other devices not shown, or may include fewer devices than those shown.

In the depicted example, network 12 may be or may include the Internet. Computer system 10 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of an exemplary data processing system 30 is shown in which illustrative embodiments may be implemented. Data processing system 30 is an example of a computer, such as server 14 or client computer 20 in FIG. 1, in which computer-usable program code or instructions implementing the processes may be located for the illustrative embodiments. In this illustrative example, data processing system 30 may include communications fabric 32, which provides communications between a processor unit 34, a memory 36, a persistent storage 38, a communications unit 40, an input/output (I/O) unit 42, and a display 44. In other examples, a data processing system may include more or fewer devices.

Processor unit 34, also referred to simply as a processor, may serve to execute instructions for software that may be loaded into memory 36 from persistent storage 38. Processor unit 34 may be a set of one or more processors or may be a multi-processor core, depending on the particular implementation. Further, processor unit 34 may be implemented using one or more heterogeneous processor systems in which a main processor is present with secondary processors on a single chip. As another illustrative example, processor unit 34 may be a symmetric multi-processor system containing multiple processors of the same type.

Memory 36 and persistent storage 38 are examples of storage devices. A storage device is any piece of hardware that is capable of storing information on either a temporary basis and/or a permanent basis. Memory 36, in these examples, may be, for example, a random access memory or any other suitable volatile or non-volatile storage device. Persistent storage 38 may take various forms depending on the particular implementation. For example, persistent storage 38 may contain one or more components or devices. For example, persistent storage 38 may be a hard drive, a flash memory, a rewritable optical disk, a rewritable magnetic tape, or some combination of the above. The media used by persistent storage 38 also may be removable. For example, a removable hard drive may be used for persistent storage 38.

Communications unit 40, in these examples, provides for communications with other data processing systems or devices. For example, communications unit 40 may be a network interface card. Communications unit 40 may provide communications using either or both physical and wireless communications links.

Input/output unit 42 allows for input and output of data with other devices that may be connected to data processing system 30. For example, input/output unit 42 may provide a connection for user input through a keyboard and mouse. Further, input/output unit 42 may send output to a printer. Display 44 displays information to a user.

Instructions for the operating system and applications or programs are located on persistent storage 38. These instructions may be loaded into memory 36 for execution by processor unit 34. The processes of the different embodiments may be performed by processor unit 34 using computer implemented instructions, which may be located in a memory, such as memory 36. These instructions are referred to as program code, computer-usable program code, or computer-readable program code that may be read and executed by a processor in processor unit 34. The program code in the different embodiments may be embodied on different physical or tangible computer-readable media, such as memory 36 or persistent storage 38.

Program code 50 may be located in a functional form on a computer-readable media 52 that is resident on a local or remote storage device or is selectively removable and may be loaded onto or transferred to data processing system 30 for execution by processor unit 34. Program code 50 and computer-readable media 52 form computer program product 54 in these examples. In one example, computer-readable media 52 may be in a tangible form, such as, for example, an optical or magnetic disc that is inserted or placed into a drive or other device that is part of persistent storage 38 for transfer onto a storage device, such as a hard drive that is part of persistent storage 38. In a tangible form, computer-readable media 52 also may take the form of a persistent storage, such as a hard drive, a thumb drive, or a flash memory that is connected to data processing system 30. The tangible form of computer-readable media 52 is also referred to as computer-recordable storage media. In some instances, computer-recordable media 52 may not be removable.

Alternatively, program code 50 may be transferred to data processing system 30 from computer-readable media 52 through a communications link to communications unit 40 and/or through a connection to input/output unit 42. The communications link and/or the connection may be physical or wireless, or a combination of physical and wireless in the illustrative examples. The computer-readable media also may take the form of non-tangible media, such as communications links or wireless transmissions containing the program code.

The different components illustrated for data processing system 30 are not meant to provide architectural limitations to the manner in which different embodiments may be implemented. The different illustrative embodiments may be implemented in a data processing system including components in addition to or in place of those illustrated for data processing system 30. Other components shown in FIG. 2 can be varied from the illustrative examples shown. As one example, a storage device in data processing system 30 is any hardware apparatus that may store data. Memory 36, persistent storage 38, and computer-readable media 52 are examples of storage devices in tangible forms.

In another example, a bus system may be used to implement communications fabric 32 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 36 or a cache such as found in an interface and memory controller hub that maybe present in communications fabric 32.

As noted above, systems, methods, and computer program products are disclosed herein for ranking a user's connections in electronic social networks and generating signature graphs of those networks based on the ranked connections. "Social network" may be abbreviated to "SN."

Figure 3:
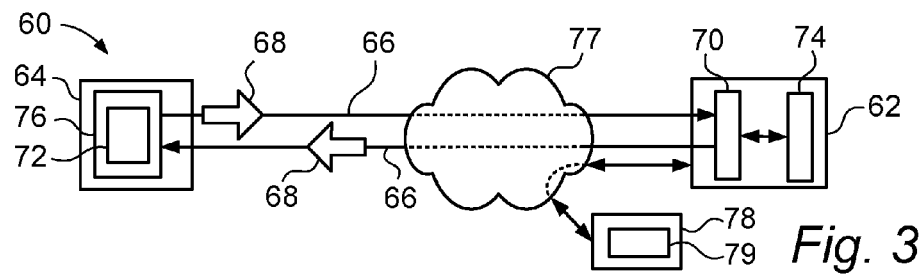
FIG. 3 is a block diagram of an example of a social network (SN) system in which illustrative embodiments may be implemented.

Referring now also to FIG. 3, a representative architecture for an electronic SN system, indicated generally at 60, is shown. A SN may be a community of persons and organizations who share relationships and communicate with each other. For example, an electronic SN may be an online community that communicates via a computer network. An electronic SN may be coordinated by, for example, a SN website that provides features that allow users to join the SN, create connections with other users, communicate electronically with other users via shared connections, and view and respond to content provided by the website.

System 60 may be an example of a computer or communications network 12 adapted to serve as a community of interconnected users. System 60 may include one or more SN servers 62, one or more client devices 64, and one or more communications networks 66. System 60 may include other, alternative, or additional elements and may omit one or more elements.

SN server 62 may be a computer system that provides computation and/or communication resources for SN system 60. For example, server 62 may provide resources for managing user accounts, transmitting electronic communications 68, tracking and analyzing user activity, and so on. Server 62 may host a SN website 70, which may offer a user interface 72 to users 82 and other visitors, for example, to provide features used to create, manage, and delete accounts; offer, accept, and refuse connections to other users 82; send and receive communications 68, and so on. Website 70 may include features that display communications 68 from a SN service provider and/or its partners, affiliates, and advertisers and that allow users 82 to interact with and/or respond to the displayed communications 68. For example, website 70 may carry polls, advertising, and other features that may provide response mechanisms.

Server 62 may provide back-end functionality for system 60, such as, maintaining a database or other registry 74 of data about users 82, connections 84, system 60, and SN 80. Registry 74 may include, for example, data that describes each user account (such as a login ID, password, real name, contact information, e-mail address, billing data, unique identifier, and so on), data that describes network structure (such as records of connections between each user 82 and other users 82), and/or data that describes activity within SN 80 (such as communications 68 sent to or received by each user 82). Server 62 may provide HTML, database, script-execution, and other services appropriate for hosting a website 70 that implements SN 80. System 60 may employ multiple servers 62, for example, to divide distinct tasks among distinct servers 62. Server 62 may be an example of server 14, 16.

A client device 64 may be any hardware/software device used by one or more users 82 to access, display, and/or interact with system 60. Examples of devices 64 may include personal computers, laptop computers, personal digital assistants, tablet devices, touch-screen devices, touch-pad devices, smart phones, cellular telephones, dedicated SN appliances, SN features embedded in products, and so on. Device 64 may communicate with server 62, for example, to exchange data and/or communications 68 with other users 82 of system 60 via server 62. Device 64 may run software, such as a web browser 76, to communicate with server 62. Device 64 may be an example of client 20, 22, 24.

User interface 72 may be any hardware/software system that provides features that allow a user 82 to participate in system 60. Portions of interface 72 may run on server 62, and portions may run on device 64. For example, interface 72 may take the form of a web page of website 70 hosted on server 62 and transmitted to web browser 76 on device 64. HTML forms or other mechanisms of a SN web page may facilitate data exchange between user 82 of device 64 and website 70 of server 62.

Communications network 66 may include any data transmission pathway between device 64 and server 62. Network 66 may be wired and/or wireless and may include Internet 77, which may include cloud-based features and/or services. For example, network 66 may include a local area network that connects client device 64 to Internet 77 and thereby to server 62. Network 66 may be an example of network 12.

System 60 may include one or more social network analysis (SNA) systems 78. System 78 may an example of server 14, 16 or client 20, 22, 24 adapted to perform feature extraction, mathematical modeling, data mining, and/or other computational, statistical, or analytical tasks based on data obtained or derived from system 60. System 78 may host a SN analytics system 79, which may be a development and/or deployment toolkit for SN analysis tasks. System 78 may communicate with server 62 via a private network or via network 66 (as shown in FIG. 3). SNA system 78 may obtain data from registry 74, such as data describing the structure (e.g., users and connections) and/or activity (e.g., trace data and communications) of SN 80. SNA system 78 may obtain data from other sources, such as partners of a service provider of SN 80. Mathematical, statistical, machine-learning, and other algorithms running on system 78 may allow a SN service provider and/or other persons or organizations to predict, manage, troubleshoot, or otherwise investigate the behavior of SN 80 and/or system 60.

FIG. 3 shows an illustrative embodiment that separates SNA system 78 from SN server 62. In an embodiment, some or all of the functionality of SNA system 78 may run on one or more SNA systems 78 and/or servers 62. FIG. 3 may be considered a functional or conceptual illustration that shows logical relationships of system 60. Physical relationships may differ from that shown, for example, by implementing all or part of SNA system 78 and SN server 62 on the same host computer(s). System 78, whether implemented separately or in combination with other portions of system 60, sometimes may be referred to as an "electronic apparatus."

FIG. 3 shows an illustrative example of system 60 implemented in a client-server computing system. System 60 may be implemented in other contexts and architectures. For example, a telephone service may function as system 60 where subscribers are users 82, telephones are devices 64, the telephone network is network 66, and telephone calls are communications 68. A telephone service may keep records of communications (logs of phone calls) and may apply SNA techniques to these records. For another example, an online auction service may function as system 60 where buyers and sellers are users 82, computers used for bidding and listing are devices 64, and feedback ratings are communications 68. For another example, a banking service may function as system 60 where payers and payees are users 82, financial transactions are communications 68, and transaction data is subject to SNA techniques.

Figure 4:
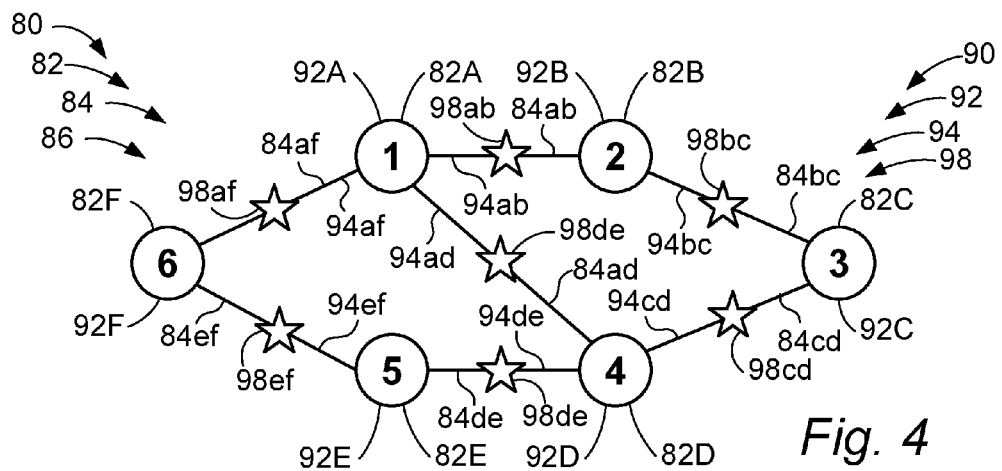
FIG. 4 is a block diagram of an example of a SN represented as a network graph that includes a set of users and user-to-user connections in accordance with the principles of the present inventions.

Referring now also to FIG. 4, electronic SN 80 may include a set of users 82, and one or more pairs of users 82 may have an associated connection 84. Each user 82 may be, for example, a person, business, organization, institution, or other entity. Each user 82 may join SN 80, for example, by creating an account with website 70, which may record associated account data in registry 74. Each user 82 may log on to an associated account, publish a profile, offer and accept connections 84 with other users 82, send and receive communications 68, share information with other users 82, and otherwise participate in a community of SN 80. Examples of SNs 80 may include online services such as Facebook®, LinkedIn®, Twitter®, and Google+®. Further examples may include telephone services, entertainment services, data services, and the like. A user 82 sometimes may be referred to as a "member." A person, business, or other entity that operates SN 80 may be called a "SN service provider."

A connection 84 may be a linkage or relationship, established within SN 80, between a pair of users 82. Each user 82 potentially may establish a connection 84 to another user 82, and therefore potentially to every other user 82. A connection 84 may be present (linked) or absent (not linked). A connection 84 may reflect or represent a friendship, followership, or other association between connected users 82. A connection 84 may be created by offer and acceptance or may be an automatic or ad hoc linkage. An established connection 84 may be broken and/or removed, such as at the request of a user 82. On offering, establishing, or breaking a connection 84, server 62 may update associated entries in registry 74. An entry for a user 82 may include, for example, data that describes a connection 84 by identifying the other user 82, connection type, connection status, creation date, and so on. The pattern of connections 84 of SN 80 may change over time, for example, as users 82 join or quit SN 80 and create or break connections 84. A connection 84 may be bidirectional, allowing communications 68 in both directions, or unidirectional, allowing communications 68 in only one direction. An example of a unidirectional connection 84 may be one associated with an account created by a SN service provider for its own use and linked to users 82 to, for example, broadcast communications 68.

Electronic communication 68 may include any data or message sent to or received by a user 82 via a connection 84, via website 70, or via other sources. Examples of types of communications 68 may include connection ("friending") requests sent, received, accepted, ignored, or declined; profile data ("wall posts") edited or viewed; comments, announcements, blog postings, or the like; received communications 68 repeated to other users (for example, re-tweets); communications 68 addressed to other users 82 or non-users; and so on. Additional examples of types of communications 68 may include invitations sent, received, accepted, ignored, or declined; groups joined or quit; subscriptions accepted or declined; articles, links, users, products, or services tagged with, for example, "like," "want," or "owned"; recommendations for or against products, services, articles, communications, web pages, or the like; and so on. Additional examples may include data obtained from browser cookies read by SN website 70 or by partner or affiliate websites; databases maintained or accessed by a SN provider and/or its partners, advertisers, or affiliates; and/or other auxiliary information sources.

Additional examples of types of communications 68 may include any data or message sent to or received by user 82 via an associated message service and/or via a publication made by a SN service provider. An example of an associated message service may be an email account provided by a SN service provider to user 82, for example, to encourage communications 68 between users 82 and non-users from the context of SN 80. An example of a publication made by a SN service provider may be a communication 68 indexed by a search engine (Google® or Bing®, for example) and publically accessible to users 82 and/or non-users. For example, a user 82 may create a website-like page on SN 80, the SN service provider may allow a search engine to index the website-like page, and incoming referrals from the search engine may be considered communications 68.

Senders and recipients of communications 68 may include other users 82, non-users exchanging messages with user 82 through associated services, and/or the SN service provider and/or its partners and affiliates. To include external communications 68 in a signature graph 112, the graph may include each search engine, message service, or external other communication source as a special external user 82. For example, referrals from a search engine may be considered a salient signal and included during SN analysis by modeling the search engine as a connected user 82.

The scope of access to communication 68 may be controlled, for example, by privacy options set by user 82. Communication 68 may be globally public (accessible to all users 82 and non-users); locally public (accessible to all registered users 82 but not to non-users); community (accessible only to connected users 82), or private (accessible only to specified users 82), for example. Each type, actual source, and/or scope of communication 68 may represent a distinct data source.

Communication 68 may include data actively sent by one user 82 to one or more users 82 or non-users, for example, as a message broadcast by a first user 82A to all other users 82 connected to user 82A. Additionally, communication 68 may include data passively shared by a user 82. Profile data, for example, may be posted in a public or private location and shared to other users 82 who may visit the location and view the data. Communications 68 may include content displayed on website 70. For example, an advertisement on website 70 broadcast to all users 82 or targeted to selected users 82 may be communication 68. Communication 68 sometimes may be referred to as a "message."

Establishing a connection 84 between users 82 may enable passing communications 68 between directly connected users 82 and potentially also among indirectly connected users. For example, if first user 82A connects to second user 82B and second user 82B connects to third user 82C, then first user 82A may be able to exchange communications 68 with third user 82C as a result of their indirect connection via second user 82B. SN 80 thus may include subsets or clusters of users 82 who are linked together as communities of mutual friends. Clusters may be a spontaneous result of preexisting relationships or common interests, an arranged result of a promotional effort, or otherwise created.

System 60 may maintain distinctions among categories of connection 84. For example, system 60 may distinguish between user-to-user, business-to-user, system-to-user, and system-to-business connections 84. For another example, system 60 may track offered, accepted, or broken connections 84 as categories because connection status such as pending, accepted, avoided, or rejected may contain information about relationships between users 82. Each category or status of connection 84 may represent a distinguishable feature or data source 97, for example.

SN 80 may be represented or modeled as a network graph 90 that includes a set of nodes 92, where each node 92 may be a representation or abstraction of a user 82. Each pair of nodes 92 accordingly may have an associated link 94, where each link 94 may be a representation or abstraction of a connection 84. In the illustrative example of FIG. 4, node 92A represents user 82A, node 92B represents user 82B, and so on. As depicted, node 92A connects to node 92B by link 94ab, to node 92D by link 94ad, and to node 92F by link 94af. Node 92A does not directly connect to nodes 92C or 92E. Node 92D does connect to node 92C and 92E, however, so that node 92A has indirect, second-degree links to nodes 92C and 92E via node 92D. Each of the other nodes 92B, C, D, E, and F has its own pattern of links 94. The topology of a network graph 90 defined by nodes 92 and links 94 may be called a "link structure 86." Link structure 86 may include associated data or metadata, such as a connection category and connection status for each link 94.

For simplicity, FIG. 4 depicts a representative network graph 90 with six nodes 92A-F at a particular moment in time. Actual SNs 80 may have any number of nodes 92—for example, millions of users—so that representing the underlying SN 80 may require a network graph 90 with millions of nodes 92 and links 94. Link structure 86 may change over time and may reflect the structure of real-world and online friendships, which tend to be influenced by proximity, shared interests, and other factors. Since people tend to form groups based on interlocking friendships, the link structure 86 of the corresponding network graph 90 may include clusters and subpopulations of cross-connected users.

Because a node 92 may be an abstraction or representation of a user 82, the terms "node" and "user" may overlap, with "user" more common in physical or tangible contexts and "node" more common in logical or mathematical contexts. "Link" may similarly overlap with "connection." Node 92 accordingly may refer to user 82; user 82, to node 92; link 94, to connection 84; and connection 84, to link 94. A node 92 may be referred to as a vertex, and a link 94 may be referred to as an edge. In the figures and elsewhere, the "A-N" notation may indicate an indefinite range, where "A" refers to a first item and "N" (or other letter, for example, to distinguish one range from another) refers to a second, third, or subsequent item. The examples of FIGS. 4-8 and elsewhere represent an illustrative SN 80 with six nodes. Actual SNs may have more or fewer nodes 92 and/or links 94 than the examples shown.

Network graph 90 or may include zero or more weights 98, each associated with a link 94 or node 92. Weight 98 may be a quantity, coefficient, parameter, score, rank, probability, and/or other value used to encode or represent a feature, characteristic, or property of a node 92 or link 94. For example, weight 98 may be a value that represents the influence of associated user 82 within SN 80. Node 92A that represents an active or influential user 82A, for example, might have a larger weight 98 than a node 92B of passive or unpopular user 82B. Weights 98 may be used in equations that generate or implement, for example, a graph or a model to represent differences in probability, influence, affinity, and so on. Each node 92 or link 94 may have zero or more associated weights. For example, a link 94 may have one associated weight 98 to represent a probability value 116, another weight 98 to represent an influence value, another weight 98 to represent a rank, and so on. Equations that compute the values of weights 98 may consider factors, such as link structure 86, probability values, content of trace data 96, the frequency of propagation of communications 68 to distant users 82, and so on. The presence of weights 98 in network graph 90 (or neighbor graph 100 or signature graph 112) may improve its ability to emulate and/or predict the behavior of a modeled SN 80.

Figure 5:
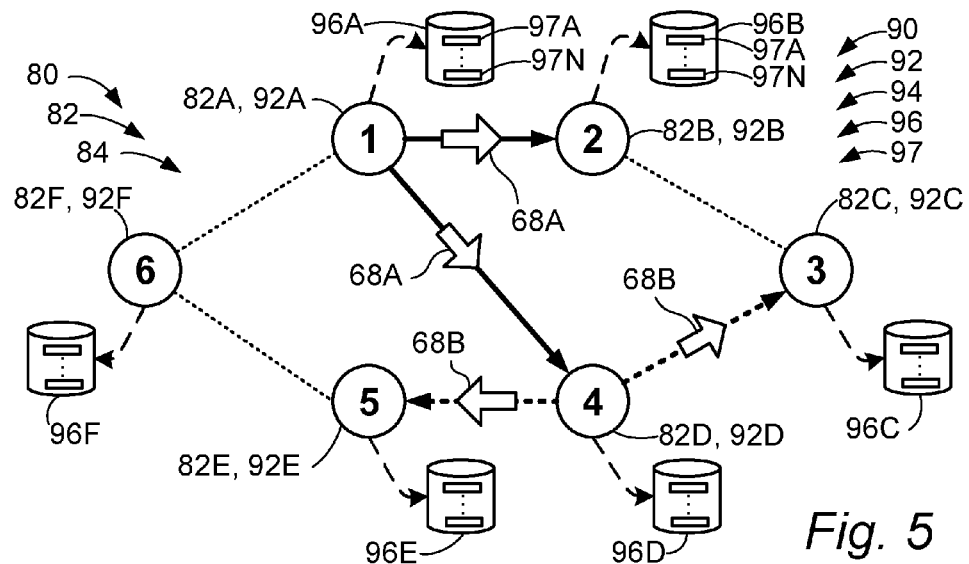
FIG. 5 is a block diagram of an example a SN represented as a network graph showing representative communications traffic between users in accordance with the principles of the present inventions.

Referring now also to FIG. 5, system 60 may collect trace data 96 about one or more users 82. Trace data 96 may include, for example, any data measured, monitored, recorded, streamed, and/or stored by system 60 to track the activities of one or more users 82 on SN 80. In the illustrative example of FIG. 5, user 82A associated with node 92A sends communication 68A to connected users 82B and 82D (nodes 92B and 92D) but not to connected user 82F (node 92F). User 82B receives communication 68A but does not share it. User 82D relays communication 68A to users 82C and 82E as communication 68B. A communication 68 may thus may pass from user to user (node to node) via the available connections 84 (links 94), initially to users 82 with first-degree connections 84 to starting user 82A, and ultimately to distant users 82, who may be persons unknown to starting user 82A.

A SN service provider may, for example, monitor, record, and/or analyze data generated by SN 80 and/or system 60 to track activities of users 82 and/or monitor changes in link structure 86. Trace data 96 may include any source or stream of data monitored, collected, sampled, maintained, and/or recorded from SN 80 and/or system 60. For example, trace data 96 may include values that document the content, timing, sources, recipients, and other characteristics of communications 68 and other activity occurring on SN 80 or system 60.

A SN service provider may collect trace data 96 on a per-node (per-user) basis. For example, as shown in FIG. 5, node 92A generates trace data 96A representing the activity of associated user 82A, node 92B generates trace data 96B of user 82B, and so on. For example, trace data 96A may document the sending of communication 68A to users 82B and 82D; trace data 96B may document the receipt of communication 68A; and trace data 96D may document the receipt of communication 68A and the retransmission of communication 68A as 68B to users 82C and 82E. Each instance of trace data 96 may, for example, be preserved in a corresponding activity trace log file to preserve the trace data and enable analysis of activity over time.

Trace data 96 may include a plurality of data sources 97. Each data source 97 may represent an aspect or feature of the data of trace data 96. Any feature that may be identified, measured, derived, or extracted from trace data 96 may be referred to as a data source 97. For example, trace data 96A may include data about connection requests received by user 82A—and that portion of trace data 96A may be extractable from trace data 96A as a data source 97A specific to user 82A. For another example, trace data 96A may include data about log-in and log-out behavior by user 82A—and that portion of trace data 96A may be extractable as a data source 97B that relates to the session frequency and duration of user 82A.

Trace data 96 from multiple users 82 may, for example, be combined, merged, aggregated, or otherwise processed to summarize the behavior of a user 82, selected users 82, or all users 82 with respect to a specified activity or event. For example, trace data 96 may contain data about receipt of and/or responses to a particular communication 68 broadcast to one or more users 82 via website 70. Data in multiple instances of trace data 96 relating to that communication 68 may be extractable as a data source 97. A data source 97 may correspond to an actual or effective origin of data. For example, an external search engine may pass referrals to users 82 of SN 80 via its search results. Referrals from the search engine to users 82, recorded in multiple instances of trace data 96, may be extractable as a data source 97. A data source 97 may be any selection of trace data 96 defined by one or more features or criteria that select the data of interest. Examples of such features or criteria may include "connection invitations ignored longer than 30 days," "user-to-user communications 68 that include a specified string of characters," and so on. Trace data 96 may be (or may be considered) a database, and data source 97 may be (or may be considered) a result returned by a query. Results extracted from multiple selection features, criteria, or queries may, for example, be combined to summarize a particular category of activity occurring within SN 80. For example, SN 80 may be a data source 97 to measure system-level values, such as total number of users 82, average number of connections 84 per user 82, and so on.

Trace data 96 may derive from different actual sources of data, contain mixed content, and reflect high-volume communications 68. Trace data 96 accordingly may be considered a heterogeneous, dynamic source of data. Link structure data, in contrast, may tend to be more static, since a user 82 may tend to send and receive communications 68 more often than the user 82 adds or drops connections 84.

Figure 6:
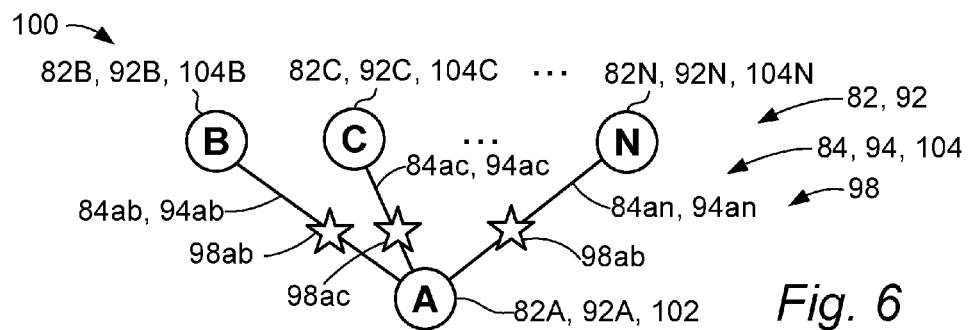
FIG. 6 is a block diagram of an example of a portion of a SN represented as a neighbor graph that includes one user and other users connected to that user in accordance with the principles of the present inventions.

Referring now also to FIG. 6, a neighbor graph 100 may represent a selected user 82A, users 82B-N connected to user 82A, and connections 84ab through 84an between user 82A and each user 82B-N. A neighbor graph 100 may represent a portion of a network graph 90 that includes selected user 82A and the first-degree connections of that user 82A. Selected user 82A at the focus of graph 100 may be referred to as given user 102. A set of users 82B-N having first-degree connections 84 to given user 102 may be referred to as friends or neighbors 104B-N of user 82A or given user 102.

In graph 100, a weight 98 may represent any value associated with a node 92 or link 94 between given user 102 and a neighbor 104B-N. For example, each weight 98ab, 98ac, 98an may be a probability value associated with a link 94, and the set of weights 98 may be a probability distribution 114 of given node 102 over neighbors 104. A computerized implementation of graph 100 may generally follow the conceptual abstraction of FIG. 6 and may be coded in any way appropriate to the SNA task.

A SN service provider may be considered as a special system user 82, and each new user 82 may automatically create an express or implied connection 84 to system user 82, for example, when creating a new account. A network graph 90, neighbor graph 100, signature graph 112, or model 110 may, for example, include system user 82 and a connection 84 between system user 82 and each other user 82 to include system-to-user communications 68 during SNA analysis. Website 70 may be regarded as an expression of a connection 84 between system user 82 and another user 82. For example, a SN service provider may include content such as polls, informative messages, and/or advertising on website 70, which may include features that allow user 82 to respond to the content. SN analysis may include this content and interaction with it as communications 68 between system user 82 and other users 82 and may include communications 68 in network graph 90, neighbor graph 100, signature graph 112, or model 110.

Figures 7, 8:
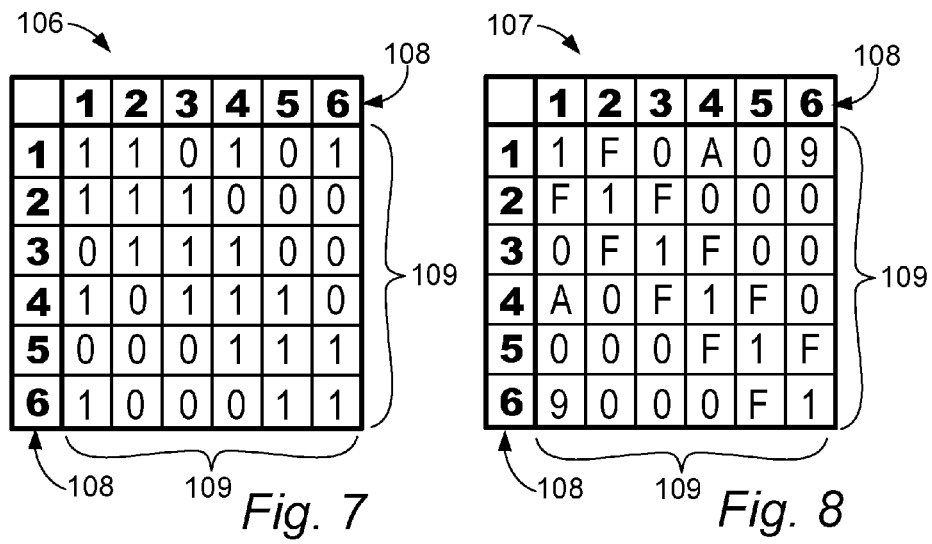
FIG. 7 is a block diagram of an example of a tabular graph encoded in binary values in accordance with the principles of the present inventions.
FIG. 8 is a block diagram of another example of a tabular graph encoded in a set or range of values in accordance with the principles of the present inventions.

Referring now also to FIG. 7, network graph 90, neighbor graph 100, or associated data may be represented as a tabular graph 106, which may be used to represent links 94 between pairs of nodes 92 as binary data. In FIG. 7, each node 92 corresponds to a row and/or a column 108, and each link 94 corresponds to a row, column intersection that identifies data 109. For example, row 1, column 1 may correspond to node 92A; row 2, column 2 may correspond to node 92B; and so on. Using "1" to indicate "link present" and "0" to indicate "link absent," the presence of link 94ab between node 92A and 92B yields "1" at row 1, column 2; the absence of link 94ac between node 92A and 92C yields "0" at row 1, column 2; and so on.

Referring now also to FIG. 8, another example of a tabular graph 107 is shown. Tabular graph 107 represents a set or range of values as hexadecimal digits that may encode weight or probability values. Potential uses of graphs 90, 100, 106, 107, 112 may include SN analysis, which may include computerized mathematical modeling of a SN 80, system 60, or related structures.

Figure 9:
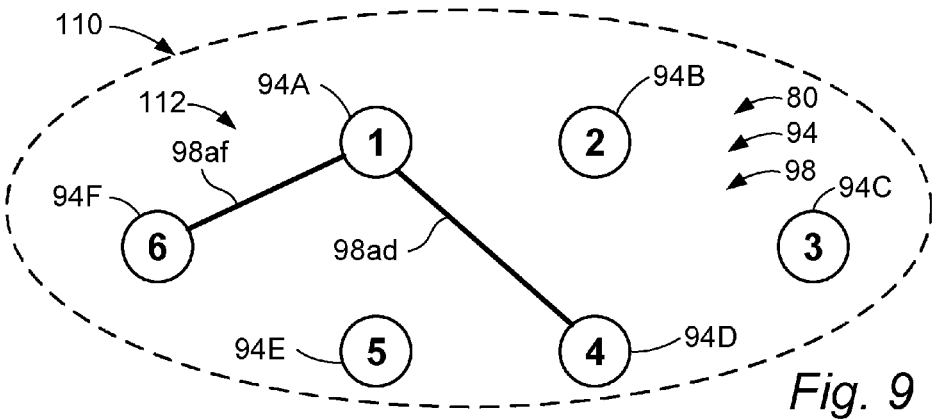
FIG. 9 is a block diagram of an example of a computational model of a SN that includes a signature graph in accordance with the principles of the present inventions.

Referring now also to FIG. 9, a computational model 110 of a SN 80 may serve as a proxy for the modeled SN 80, for example, to act as a predictive, investigative, and/or diagnostic instrument. By emulating an actual SN 80, model 110 may provide a tool for detecting the properties of the modeled SN 80, for predicting the result of a stimulus applied to SN 80, and/or for testing ideas, products, marketing campaigns, or the like independently from SN 80. Examples of SN analysis tasks may include detecting communities (e.g., clusters or subpopulations of users 82); predicting churn (e.g., users 82 who might quit SN 80 or drop a product or service); identifying influential users 82 (e.g., users 82 who lead communities or anticipate trends); predicting social mass movements; and predicting the adoption of products or services. Model 110 may allow testing to occur in secret, for example, to evaluate alternative or tentative plans.

Model 110 may include or implement a network graph 90 and/or a signature graph 112, which may be a simplified, reduced, pruned, or sparse version of a corresponding network graph 90. FIG. 9, for example, shows an example of a signature graph 112 derived from the network graph 90 of FIG. 4. Selected links 94 shown in FIG. 4 have been removed in FIG. 9. For example, link 94ab is present in FIG. 4 and removed in FIG. 9. A model 110 that includes a signature graph 112 instead of a full network graph 90 may produce faster and/or cheaper SN analysis results, for example, by reducing computational time and/or cost associated with emulating removed links 94.

SN analysis may include discovering or generating a signature graph 112 of a SN 80. A signature graph 112 may be a reduced representation of a network graph 90 that produces approximately the same result as SN 80 or network graph 90 for one or more SN analysis tasks. For a SN 80 modeled as a graph Graph(Vertices,Edges) or G(V,E), a signature graph 112 may be a sub-graph SIGN(V,E'), potentially of smaller or much-smaller size then the full network graph G(V,E). A graph 112 may be created by removing edges E (in other words, links 94). The removed and/or retained links 94 may be selected so that SN analysis performed on graph 112 yields about the same result as the same SN analysis performed on the corresponding SN 80 or network graph 90. Differences between a modeled SN 80 (or network graph 90) and a corresponding graph 112 may be measured by, for example, monitoring the same value or signal in both contexts to evaluate a difference.

Figure 10:
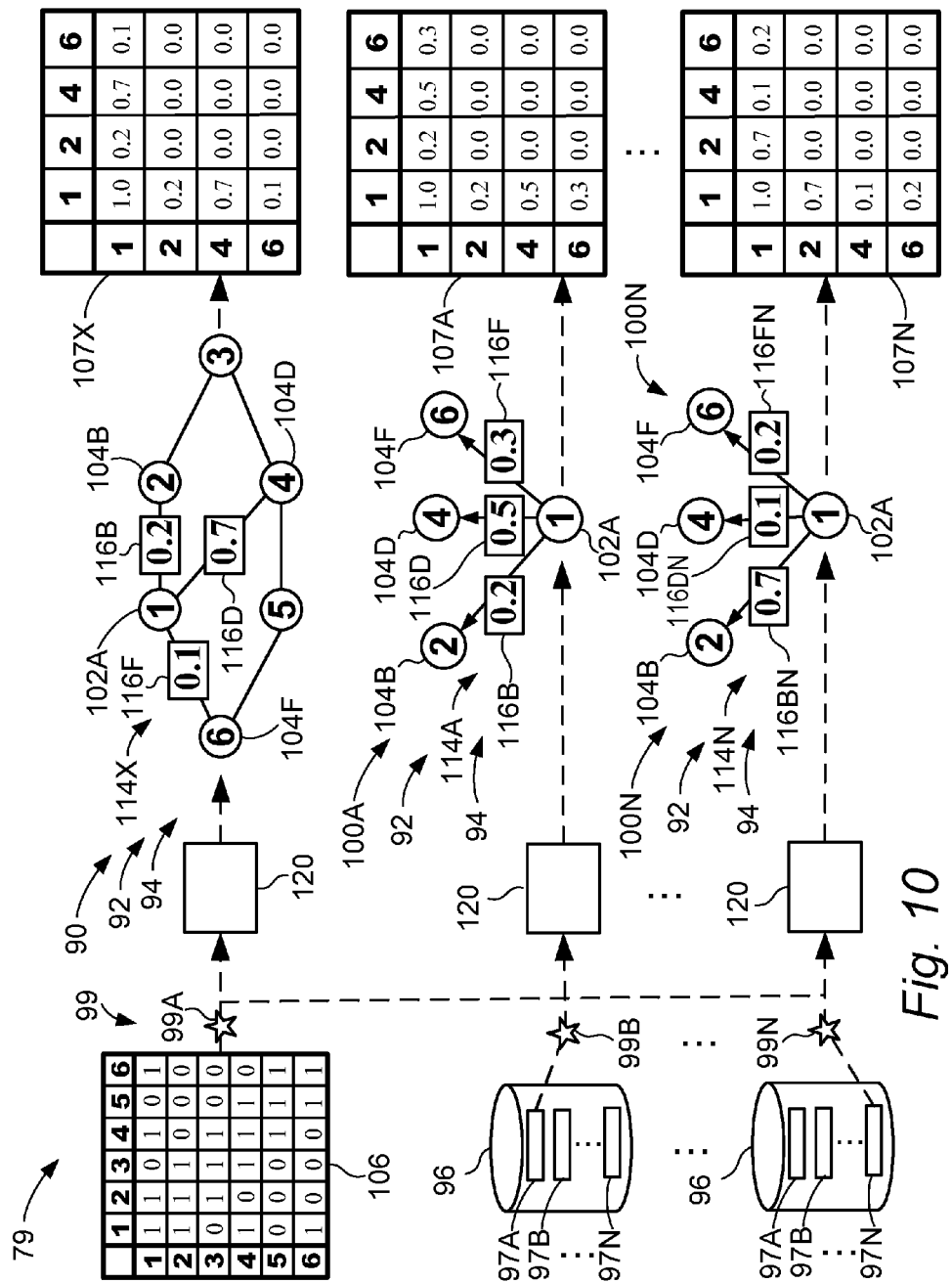
FIG. 10 is a block diagram of an example of a portion of a SN analytics system inducing probability distributions for a given user and connected neighbors of that user in accordance with the principles of the present inventions.

With reference also to FIG. 10, SN analytics system 79 may be a development and/or deployment environment that includes programs, tools, data, and other resources for generating and/or executing a signature graph 112 and/or model 110. Generating a graph 112 from SN 80 or network graph 90 may include inducing, for some or all nodes 92 (each in turn a given node 102) and for some or all data sources 97, a probability distribution 114 over neighboring nodes 104. Inducing a distribution 114 may include the use of machine-learning techniques, such as a learning to rank (LTR) algorithm 120. Generating graph 112 may include assigning or evaluating a relative importance value of each data source 97, where a data source 97 may include topological data (link structure 86) and/or temporal data (trace data 96). Assigning a relative importance value may include computing Kullback-Leibler divergence values, which may measure distances or differences between pairs of distributions 114. Measuring differences between distributions 114 associated with data sources 97 may allow evaluation of an average distance for each data source 97 over all nodes 92 of SN 80. Evaluating an average distance for each data source 97—potentially in conjunction with feature selection and/or cluster analysis techniques—may allow measurement of relative importance, for example, to identify representative or important data sources 97. Assigning relative importance to data sources 97 may allow removing one or more selected data sources 97 from network graph 90 or neighbor graph 100, for example, to simplify computation by excluding selected data sources 97. One or more data-source weights 99, each associated with a data source 97, may act as parameters, coefficients, or other values considered in calculations involving an associated data source 97. A relative importance value, for example, may be quantified as a weight 99 used to increase or decrease the impact of the data source 97 in signature graph 112 according to its measured relative importance value.

Generating signature graph 112 may include aggregating distributions 114 to produce an overall distribution (or ranking) of neighbors 104 of node 102, in effect summarizing multiple distributions 114 (per each neighbor 104 and per each data source 97) as an aggregated distribution (per each neighbor 104 and per all data sources 97). The process of aggregating distributions 114 may include the use of voting rules such as Kemeny-Young and/or Borda Count rules.

Generating graph 112 may include removing links (edges) 94 from the entire graph G(V,E). The selection of retained and/or removed links 94 may employ, for example, a threshold function and/or a probability function. For example, removing links 94 by sampling links 94 in proportion to aggregated rank may yield a signature graph 112 that probabilistically retains high-, medium-, and low-ranking links 94, so that even low-ranking links 94 proportionately contribute to graph 112. The number of links 94 removed or retained may depend on a desired compression ratio and/or a specified acceptable error level.

A SN 80 may yield more than one signature graph 112. Different SN analysis goals or tasks, for example, may influence the selection of data sources 97, features, parameters, and/or algorithms used to generate graph 112, thereby deriving different graphs 112 from the same SN 80. A graph 112 may change over time, for example, by updating trace data 96 and regenerating graph 112.

SN analysis using graph 112 may enable analysis and/or prediction to occur substantially in real time. A model 110 that includes a graph 112 may endeavor to maintain a specified level of accuracy, for example, through the use of algorithms or techniques that minimize one or more differences (errors) between graph 112 of model 110 and the modeled SN 80 or system 60. Comparing result and/or error values between a model 110 and the modeled SN 80 may include, for example, measuring one or more signals or values in both contexts and measuring or monitoring any difference for each signal or value.

Generating a graph 112 may include identifying one user 82 and identifying connections 84 of the one user 82 with other users 82 in an electronic SN 80. Identifying one user 82 of interest may include selecting a particular user 82 by, for example, arbitrary selection, random selection, human choice, or specified attributes. Attributes may exclude from selection system, external, or specified users 82 and/or users 82 with zero connections 84. After identifying one user 82A for initial analysis, identifying connections 84 of user 82A may include looking up in registry 74 the current set of other users 82 connected to user 82A, thereby identifying a set of other users 82. The one user 82A may be considered as given node 102, and the other connected users 82 as neighbors 104. For example, in the illustration of FIG. 10, the identified user 82 may correspond to node 102A, and the identified other users 82 may correspond to neighbors 104B, D, F of node 102A. Data regarding the one user 82A or 102 and connected other users 82 or 104 as well as associated link structure 86, trace data 96, and/or other values of interest may be copied to or referenced by SNA system 78, for example, to isolate the live data on SN server 62 from SN analysis tasks.

Generating a signature graph 112 may include creating a neighbor graph 100 that includes the one user 82A (given node 102), other users 82 connected to the one user 82A (neighbors 104), and connections 84 between the one user 82A and other users 82. Neighbor graph 100 may, for example, be implemented as computer program code that expresses the abstraction of FIG. 6. For example, in the illustration of FIG. 10, neighbor graph 100A includes a given node 102A, neighbors 104B, D, F of node 102A, and a set of links 94 between node 102A and each neighbor 104B, D, F.

After generating a neighbor graph 100 for a first given node 102 and its neighbors 104, the process of constructing model 110 may continue to create a neighbor graph 100 for second and subsequent given nodes 102 and respective neighbors 104. The process may iteratively continue and may ultimately evaluate each user 82 of SN 80 as a given user/node 102. Model 110 may, in effect, include multiple neighbor graphs 100, reduced to signature graphs 112, and combined as a network graph 90 that emulates all or part of SN 80.

Generating signature graph 112 may include analyzing a plurality of data sources 97 for communications 68 between one user 82 (node 102) and connected other users 82 (neighbors 104). Analysis may include inducing a probability distribution 114 from data source 97 for the given node 102 with respect to each other neighbor 104. EQ. 1 provides an expression of a probability calculation.

$$f_i^s(j) \forall j \in N(i)$$

such that $$\sum_{j \in N(i)} f_i^s(j) = 1 \text{ and } 0 \le f_i^s(j) \le 1$$

where given node 102 is node i, a neighbor 104 is node j, and a data source 97 is Ds. Iterative calculation may continue for node 102 over all neighbors 104 and all data sources 97. Iterative calculation may ultimately evaluate some or all users 82 as given node 102 (node i) to calculate a distribution 114 for each user 82, that user's neighbors 104, and some or all data sources 97.

For example, in the illustration of FIG. 10, data source 97A of trace data 96, applied to node 102A with neighbors 104B, D, F, may induce a probability distribution 114A comprising a probability value 116B, D, F evaluated for each neighbor. An illustrative example may be using a history of product recommendations by user 82A (node 102 or i) as a data source 97 to evaluate the probability that user 82A forward a product recommendation to user 82B (node 104B or j). A higher probability for this outcome may reflect a stronger bond or common interest between users 82A and 82B, for example.

One way to induce a probability distribution 114 of a node i over its neighboring nodes j is to apply machine-learning techniques, such as a learning-to-rank (LTR) algorithm that, given training data, may extract a learned ranking function, which may be viewed as a probability distribution function over neighbors of node i, as shown below.

$$\langle f_i^s(1), f_i^s(2), \ldots, f_i^s(n_i) \rangle$$

Ranking may refer to a process of placing a list or set of items in sequence. For example, a search engine may retrieve result items after a query, rank the results by relevance, and return ranked results to the requesting browser. An information processing or retrieval system that performs ranking may include a ranking model, which is a portion of the system that encapsulates a ranking standard and applies it to new, unseen data. A LTR algorithm may automatically generate a ranking model by applying machine-learning techniques. Supervised learning techniques, for example, may use a training data set consisting of a set of examples, each tagged with an expected result, to generate a ranking model. Training data for a ranking model might include a set of stimulus (event) values, such as queries, each with an associated response (outcome), such as an item matching the query, together with a value, score, or other measure of the rank and/or relevance of the response to the stimulus.

One way to prepare a training data set may be to obtain a set of representative examples, have a human arrange the examples in a series (an expected result), and score each example according to its position in the series. Training data may be obtained automatically or semi-automatically, for example, by extracting examples from a working system and tagging each example with an expected result based on the observed behavior of the system. For example, a search engine may automatically collect click-through data to obtain a training set for a ranking model. For example, an OCR system may automatically collect OCR images, present images over the Internet as a Turing test, and tag each image with human readings to obtain a training set for an OCR classifier. For an example from a SN 80, training data to generate a ranking model that sorts communications 68 by anticipated popularity may include examples of communications 68, each tagged with the number of times the communication 68 was passed to another user 82, and each potentially associated with features and/or attributes that may indicate or influence popularity. Trace data 96 that records a history of communications 68 may allow training data to be obtained retrospectively from SN 80.

During training, LTR algorithm 120 may rank training data with its current ranking model, compare the actual and expected order, measure an error value, apply a learning rule to adjust weights or other values to reduce error, and repeat the training cycle until the current ranking model sorts training data (or a test data set of tagged examples) approximately in an expected order. After training, the learned ranking model may be used as a ranking function to sort new, unseen data into a series similar to that of the training data.

In an embodiment, the process of generating a signature graph 112 may use an LTR algorithm 120 to induce a probability distribution 114 of a node 102 over its neighbors 104 by learning a probability distribution function for node 102. As shown in FIG. 10, link-structure data 106 may be used to identify one node 102 (node i) and its neighbors 104B, D, F (nodes j). Link-structure data 106 may include or refer to rankable attributes, such as number of shared connections per neighbor, total number of connections per neighbor, connection creation date and other connection metadata, influence scores and other neighbor metadata, and so on. Link-structure data 106 processed by ranking algorithm 120 may yield a probability value or weight 116B, D, F for each neighbor 104B, D, F. The resulting distribution 114X may be represented as a tabular weight graph 107X.

Trace data 96 may include multiple data sources 97A-N. Data source 97A, processed by ranking algorithm 120, may yield a probability value 116 (which may be an example of a weight 98) for each neighbor 104. Distribution 114A from trace data 97A may be expressed as graph 107A. Data source 97N similarly may yield a distribution 114N and graph 107N. For each data source 97 of trace data 96, LTR algorithm 120 in effect learns a distribution 114 by estimating or maximizing a probability function from training data sampled from each respective data source 97.

LTR algorithm 120 may include a learning rule that governs how LTR algorithm 120 adjusts its ranking model to improve its fit to the training data. In an embodiment, LTR algorithm 120 may employ a maximum likelihood base learning rule. The equation below shows an expression of this learning rule, where LS represents a link structure 86 (a set of connected nodes 92) and RS represents a communication structure (a set of nodes within LS that receives a communication 68 from a given node within LS).

$$\min_{\langle f_1^s(\cdot), f_2^s(\cdot), \ldots, f_6^s(\cdot) \rangle} \left[ -\sum_{(i,j) \in RS} \log(f_i^s(j)) - \sum_{(i,j) \in LS/RS} \log(1 - f_i^s(j)) \right]$$

s.t.

$$\sum_{j \in N(i)} f_i^s(j) = 1 \, \forall \, i \in LS$$

$$0 \leq f_i^s(j) \leq 1 \, \forall \, (i, j) \in LS$$

The above equation may implement a maximum likelihood estimation (MLE) method. Given a statistical model and a sample of a population, a MLE method may estimate parameter values within the model to fit the sample. Here, the statistical model may be a neighbor graph 100, the population sample may be data from data source 97, and parameter values may be probability values 116, each associated with a link 94 between node 102 and a neighbor 104. The above equation may estimate parameters $f_1^s()$, $f_2^s()$ and so on as probability values 116 to fit the sample of data source 97. Additionally, the above equation may select values 116 that give the observed data the greatest probability, and the set of values 116 for node 102 may represent a probability distribution 114 of node 102 over its neighbors 104.

Analyzing a plurality of data sources 97 for communications 68 between one user 82 and other connected users 82 may include assigning a relative importance value to each data source 97 of the plurality of data sources 97. Assigning a relative importance value may include calculating distances or differences between distributions 114, for example, to rank multiple distributions 114, each associated with a data source 97, in a series by relative importance.

In an embodiment, assigning a relative importance may include determining one or more Kullback-Leibler (KL) divergence values. A KL divergence value may measure a difference between two probability distributions, where the difference is the number of extra bits required to encode samples of one distribution in a code based on the other distribution. Fewer extra bits—a smaller KL divergence— may indicate greater similarity between the distributions. The equation below expresses KL divergence between two distributions $f^s$ and $f^t$.

$$KL(f^s \| f^t) = \sum_{i=1}^{n_i} f^s(i) \ln\left(\frac{f^s(i)}{f^t(i)}\right)$$

In the above equation, $KL(f^s\|f^t)$ measures the number of extra bits required to encode samples of $f^s$ in a code based on $f^t$. In other words, $KL(f^s\|f^t)$ measures similarity between $f^s$ and $f^t$. If the distributions are identical, that is, if $f^s = f^t$, then $KL(f^s\|f^t) = KL(f^t\|f^s) = 0$. In other words, identical distributions may encode each other with zero inefficacy. If the distributions are non-identical, then $KL(f^s\|f^t) > 0$, $KL(f^t\|f^s) > 0$. In other words, different distributions may encode each other with a positive inefficiency that may depend on the encoding direction and increase as the difference between the distributions increases. If distributions are the reverse of each other, the KL divergence may be a large value.

Referring now also to FIG. 11, first data source 97A may induce a first distribution 114A (or $f^s$ in the above equation) for node 102A and neighbors 104, and second data source 97B may induce a second distribution 114B (or $f^t$) for node 102A and neighbors 104. Solving the above equation yields a KL divergence of distributions 114A and 114B. The equation below and FIG. 12 show an example for a given node 102A with three neighbors 104A, B, C, and include representative probability values 116 for distributions 114A and 114B.

$$KL(f^s\|f^t) = \left[0.5 \ln\left(\frac{0.5}{0.2}\right) + 0.3 \ln\left(\frac{0.3}{0.3}\right) + 0.2 \ln\left(\frac{0.2}{0.5}\right)\right] = 0.27488722$$

$$KL(f^t\|f^s) = \left[0.2 \ln\left(\frac{0.2}{0.5}\right) + 0.3 \ln\left(\frac{0.3}{0.3}\right) + 0.5 \ln\left(\frac{0.5}{0.2}\right)\right] = 0.27488722$$

The above equation evaluates $KL(f^s\|f^t)$ and $KL(f^t\|f^s)$, thereby measuring the divergence of distribution 114A from distribution 114B and the divergence of distribution 114B from distribution 114A.

One way to order the members of a set in a series is to compare each member to a standard and sort the members by a measure of similarity to or difference from the standard. A set of distributions 114 may be ranked in a series by computing a KL divergence value for each distribution 114 with respect to the same probability distribution (a designated standard) and sorting distributions 114 by the associated KL divergence values. The designated standard may be a measured, estimated, or hypothetical probability distribution 124 selected or prepared for use as a standard of comparison. A hypothetical distribution 124 may be derived from distributions 114 that are to be compared with it, for example, as a kind of average of actual distributions 114. Other examples of hypothetical distribution 124 may include a synthetic distribution or a random distribution.

For given node 102A and neighbors 104, first data source 97A may induce a first distribution 114A, and second data source 97B may induce a second distribution 114B, for example, by evaluating data sources 97A and 97B via LTR algorithm 120. Distributions 114A and 114B may be used to synthesize hypothetical distribution 124, for example, by averaging or otherwise aggregating distributions 114A and 114B. For example, hypothetical distribution 124 (M, in the equation below) may be defined as $M = [0.5\ f^s + 0.5 f^t]$, in effect averaging distribution 114A or $f^s$ of data source 97A with distribution 114B or $f^t$ of data source 97B. Actual data sources 97A-N thus may be used to generate a hypothetical distribution 124 that subsequently may serve as a standard of comparison for distributions 114A-N, ultimately obtained from link structure 86 and trace data 96.

As shown in the equation below, evaluating a divergence for first distribution 114A or $f^s$ with respect to distribution 124 or M and also evaluating a divergence for second distribution 114B or $f^t$ with respect to distribution 124 enables a comparison of distributions 114A and 114B with respect to the same standard, namely distribution 124. The KL divergence values also permit evaluation of a distance between the divergences, as shown in the equation below.

$$JS(f^s, f^t) = [0.5 KL(f^s\|M) + 0.5 KL(f^t\|M)]$$

$$dist(f^s, f^t) = \sqrt{JS(f^s, f^t)}$$

where $M = [0.5 f^s + 0.5 f^t]$

In the above equation, $dist(f^s, f^t)$ represents a distance between first distribution 114A and second distribution 114B.

Continuing the example of FIG. 12, the equation below evaluates first distribution 114A or $f^s$ with respect to distribution 124 or M and second distribution 114B or $f^t$ with respect to hypothetical distribution 124, yielding a distance value for distributions 114A and 114B.

$$KL(f^s\|M) = \left[0.5 \ln\left(\frac{0.5}{0.35}\right) + 0.3 \ln\left(\frac{0.3}{0.3}\right) + 0.2 \ln\left(\frac{0.2}{0.35}\right)\right] = 0.107002483$$

$$KL(f^t\|M) = \left[0.2 \ln\left(\frac{0.2}{0.35}\right) + 0.3 \ln\left(\frac{0.3}{0.3}\right) + 0.5 \ln\left(\frac{0.5}{0.35}\right)\right] = 0.107002483$$

$$JS(f^s, f^t) = 0.107002483$$

$$dist(f^s, f^t) = 0.32711234$$

Obtaining a KL divergence value or other distance metric for each of a plurality of probability distributions 114 with respect to a hypothetical distribution 124 accordingly may enable the comparison or ranking of the plurality of distributions 114 with respect to each other. In effect, distributions 114 may be sorted by divergence from hypothetical distribution 124.

In an embodiment, computing a relative importance of all data sources 97 may include computing a weight value (lambda) that expresses the relative importance of a given data source 97 with respect to all data sources 97. An example of a method for computing a relative-importance value (weight lambda) may include defining a random variable $R_i^s$ for each data source 97 such that the distribution of the random variable is given by the equation below.

$$\langle f_i^s(1), f_i^s(2), \ldots, f_i^s(n_i) \rangle$$

For a pair of data sources 97 ($D_s$, $D_t$), computing a relative importance value may include computing a distance value between one data source 97A and another data source 97B (from the perspective of given node 102, node i). The equation below provides an example of a distance calculation.

$$dist_i(s,t) = \sqrt{JS(R_i^s, R_i^t)} = [0.5 KL(R_i^s\|M) + 0.5 KL(R_i^t\|M)]^{0.5}$$

where $M = 0.5 R_i^s + 0.5 R_i^t$

In the above equation, hypothetical distribution 124 may be an average of random distributions $R_i^s$ (of one data source $D_s$) and $R_i^t$ (of another data source $D_t$) for given node 102 (node i). Evaluating a KL divergence between hypothetical distribution 124 and the random distributions contributes to evaluating the distance—$dist_i(s, t)$—between data source 97A and data source 97B.

Computing a relative importance value of each data source 97 may include evaluating, for every pair of data sources 97, an average distance over all nodes 102 in SN 80. In other words, taking each node 92 in turn as given node 102, evaluate a per-node distance via the above equation, then average the resulting per-node distances. The resulting average distance in effect blends the per-node distances, yielding a single average distance value for all nodes 92 of SN 80 with respect to that pair of data sources 97. The equation below shows an example of a resulting distance matrix.

$$dist = \begin{bmatrix} node & 1 & 2 & \ldots & |V| \\ 1 & 0 & dist(1,2) & \ldots & dist(1,|V|) \\ 2 & dist(2,1) & 0 & \ldots & dist(2,|V|) \\ \vdots & \vdots & \vdots & 0 & \vdots \\ |V| & dist(|V|,1)) & dist(|V|,2) & \ldots & 0 \end{bmatrix}$$

In an embodiment, computing a relative importance value may include spectral clustering or other cluster analysis techniques.

Figure 13:
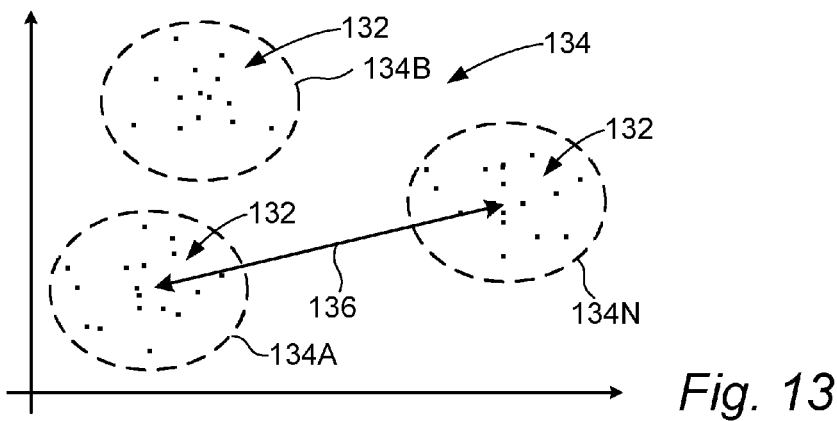
FIG. 13 is a block diagram showing an example of clustered data sources in accordance with the principles of the present inventions.

Referring now also to FIG. 13, evaluating the above equation for a plurality of data sources 97 may yield a plurality of average distance values 132. Clustering techniques, applied to the plurality of distance values 132, may disclose two or more clusters 134A-N in the distance values 132. A cluster 134 may represent a group of data sources 97 that have a natural affinity or correlation. Relative importance value (lambda) for each data source 97 (Ds) may be proportional to the local density of the cluster, as shown in the equation below.

$$\lambda_s \propto \frac{1}{\text{Local density}}$$

Computing a relative importance value for each data sources 97 may enable a selection among data sources 97, for example, to simplify computation performed by model 110 by reducing the amount of data processed by model 110. Selection among data sources 97 may seek to retain salient data sources 97 and/or omit non-salient data sources 97, for example, by considering the relative importance value of each data source 97 during a selection process. For example, in an embodiment, a selection process may remove or retain data sources 97 by sampling data sources 97 in proportion to relative importance, so that more-important and less-important data sources 97 are represented in model 110 in proportion to relative importance. In an embodiment, feature selection approaches can be used to select a subset of data sources 97.

In an embodiment, computing a relative importance value (lambda) of a data source 97 may include the application of machine-learning techniques. For any pair of data sources $(D_s, D_t)$, The equations below expresses the relative importance value (lambda) of a data source Ds in proportion to a KL divergence.

$$\lambda_s \propto KL(R_i^s \| M)$$

The above equation implies the equation below.

$$\frac{\lambda_s}{\lambda_t} = \frac{KL(R_i^s \| M)}{KL(R_i^t \| M)}$$

The above equation in turn leads to the learning formulation below.

$$\min_\lambda \sqrt{\left[ \sum_{(s,t)} \sum_{i \in V} \left( \frac{\lambda_s}{\lambda_t} = \frac{KL(R_i^s \| M)}{KL(R_i^t \| M)} \right)^2 \right]}$$

s.t.

$$\sum_{s=1}^d \lambda_s = 1$$

$$0 \le \lambda_s \le 1$$

Generating a signature graph 112 of a SN 80 may include aggregating multiple probability distributions 114 of a given node 102 with respect to its neighbors 104. Each distribution 114 may derive from a different data source 97, and each probability value 116 may measure an affinity, influence, or other relationship between the given node (user) 102 and a given neighbor (friend) 104 as observed though that data source 97. Aggregating distributions 114 derived from multiple data sources 97 may in effect blend or merge distributions 114 to measure a composite or consensus affinity between given user 102 and given neighbor 104. Aggregation may produce a consolidated score value, ultimately based on multiple data sources 97, that measures the strength of a pair-wise relationship generalized over multiple data sources 97. This measurement may enable a method for simplifying an associated neighbor graph 100 and/or network graph 90, for example, by removing links 94 to one or more selected neighbors 104 based at least in part on their aggregated or generalized scores.

In an embodiment, an aggregation process may include a Kemeny-Young (KY) ranking rule, which is a voting system that identifies the most popular choice(s) among candidates via preferential ballots and pair-wise comparison counts. A KY ranking rule requires voters to rank candidates in order by preference and may allow voters to express equal preference by placing more than one candidate at the same preference level. A KY ranking rule scores candidates with a tally table that, for each possible pair of candidates A,B counts the number of votes for A>B, A=B, and A<B. The table yields a consolidated score value for each possible preference sequence. The sequence with the highest score is the winning sequence, and the top-ranked (most popular) candidate in the winning sequence is the unique winner if one is sought.

To apply a KY ranking rule to a neighbor graph 100, each neighbor 104 of a given node 102 may act as a candidate, each data source 97 may act as a voter, and each distribution 114 derived from a data source 97 may act as a preferential ballot. Sorting neighbors 104 by associated probability values 116 sorts neighbors 104 in preference order, and neighbors 104 that happen to have the same probability value 116 may receive "equal preference" votes. Treating these probability sequences as preferential votes for neighbors 104 and tabulating the votes in a KY tally table aggregates the distributions 114 and yields a score for each possible preference sequence. The sequence with the highest score—the winning sequence—identifies a composite preference order that arranges neighbors 104 (candidates) in a popularity order influenced by all participating distributions 114 and ultimately by all corresponding data sources 97. Voting aggregates data sources 97, which pluralistically determine the winning neighbor(s) 104. A winning popularity sequence may be used to remove links 94 (sparsification), for example, by deleting links 94 to one or more neighbors 104 based on their scores or positions in the sequence.

Figure 14:
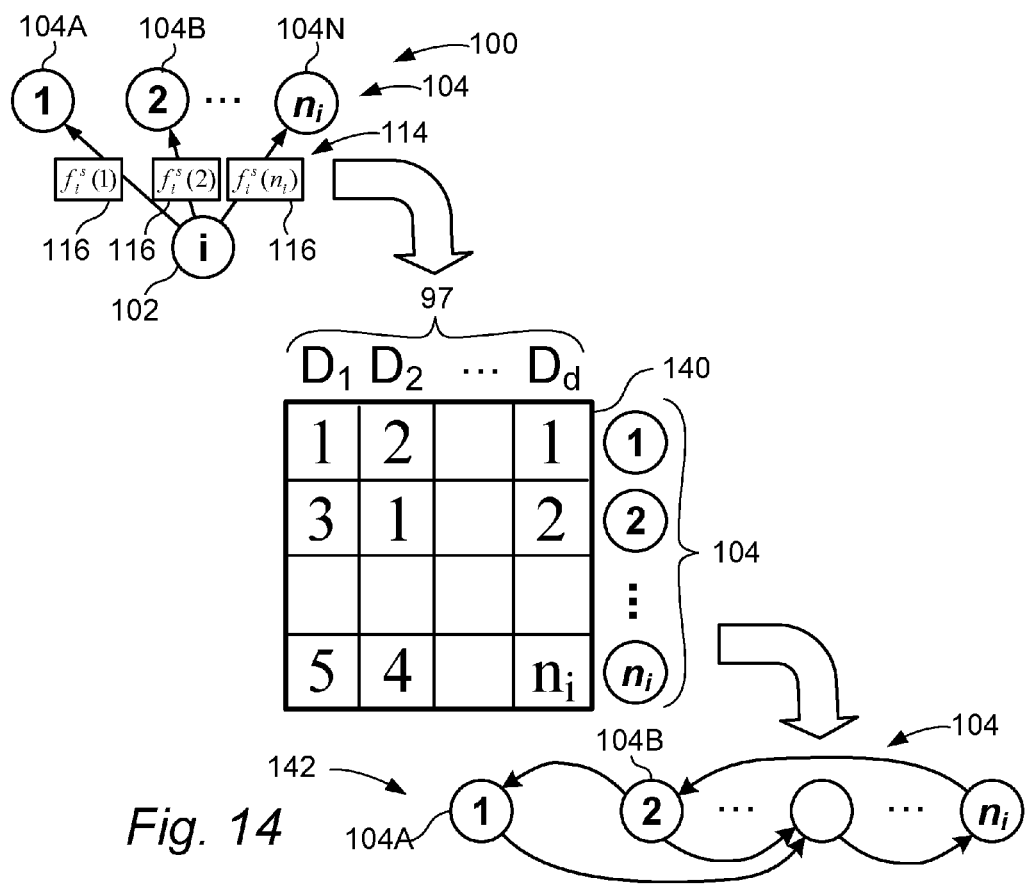
FIG. 14 is a block diagram of an example of a rank aggregation process using a Kemeny Young ranking rule in accordance with the principles of the present inventions.

Referring now also to FIG. 14, for a given node 102 with neighbors 104, each data source 97 may yield a probability distribution 114 that includes a probability value 116 associated with each neighbor 104. Placing neighbors 104 in order by probability value 116 ranks neighbors 104 in the same way that KY voters rank candidates in order by preference. KY rank matrix 140 may rank neighbors in proportion to probability mass and may act as a KY tally table. Scoring matrix 140 for each possible sequence of neighbors 104 via pair-wise voting graph 142 yields a score value for each possible sequence of neighbors 104. Sorting sequences by score identifies the sequence with the highest score, and the order of neighbors 104 within the sequence indicates the strength of a relationship between each neighbor 104 and given user 102. For example, the top-listed neighbor 104 in the winning sequence may identify the neighbor 104 with the strongest composite affinity to a given user based on the aggregated distributions 114 and ultimately on data sources 97. Preference order may be used to remove links 94, for example, by deleting neighbors 104 based on their scores (vote totals) or positions in the winning sequence.

An implementation of a KY ranking rule may be computationally complex, especially when evaluating a large number of candidates. An embodiment may use a KY approximation scheme, for example, to reduce execution times.

In an embodiment, a rank aggregation process may include a Borda Count (BC) ranking rule, which is a voting system that requires voters to rank candidates in preference order, awards points to each candidate based on preference positions, and totals points to determine an overall preference order among candidates. For example, in an election with four candidates, for each ballot, the first-place candidate receives four points; the second-place candidate, three points; and so on. Points from all ballots are totaled for each candidate, and each candidate receives a point total. The largest point total indicates the winner; the next-largest, the runner up; and so. Totals may be used to pick winner(s) or to arrange candidates in preference order.

To apply a BC ranking rule to a neighbor graph 100, each neighbor 104 may act as a candidate; each data source 97, as a voter; and each probability distribution 114, as a preferential ballot. For each distribution 114, sorting neighbors 104 by probability values 116 sorts neighbors 104 in preference order. A tie within a distribution 114 (neighbors 104 with the same probability value 116) may be resolved by, for example, random selection. Preference order within a distribution 114 controls the number of points awarded to each neighbor 104 for that distribution 114. Summing all points for all neighbors 104 for all distributions 114 yields a total score for each neighbor 104, and score order indicates preference order among neighbors 104. The totals, summed across all distributions 114, in effect aggregate distributions 114, each ultimately derived from a data source 97. All participating data sources 97 thus participate in a consensus vote that may preserve an influence from each data source 97 in the winning sequence of neighbors 104. Preference order may be used to remove links 94, for example, by deleting neighbors 104 based on scores (vote totals) or positions in the winning sequence.

Figure 15:
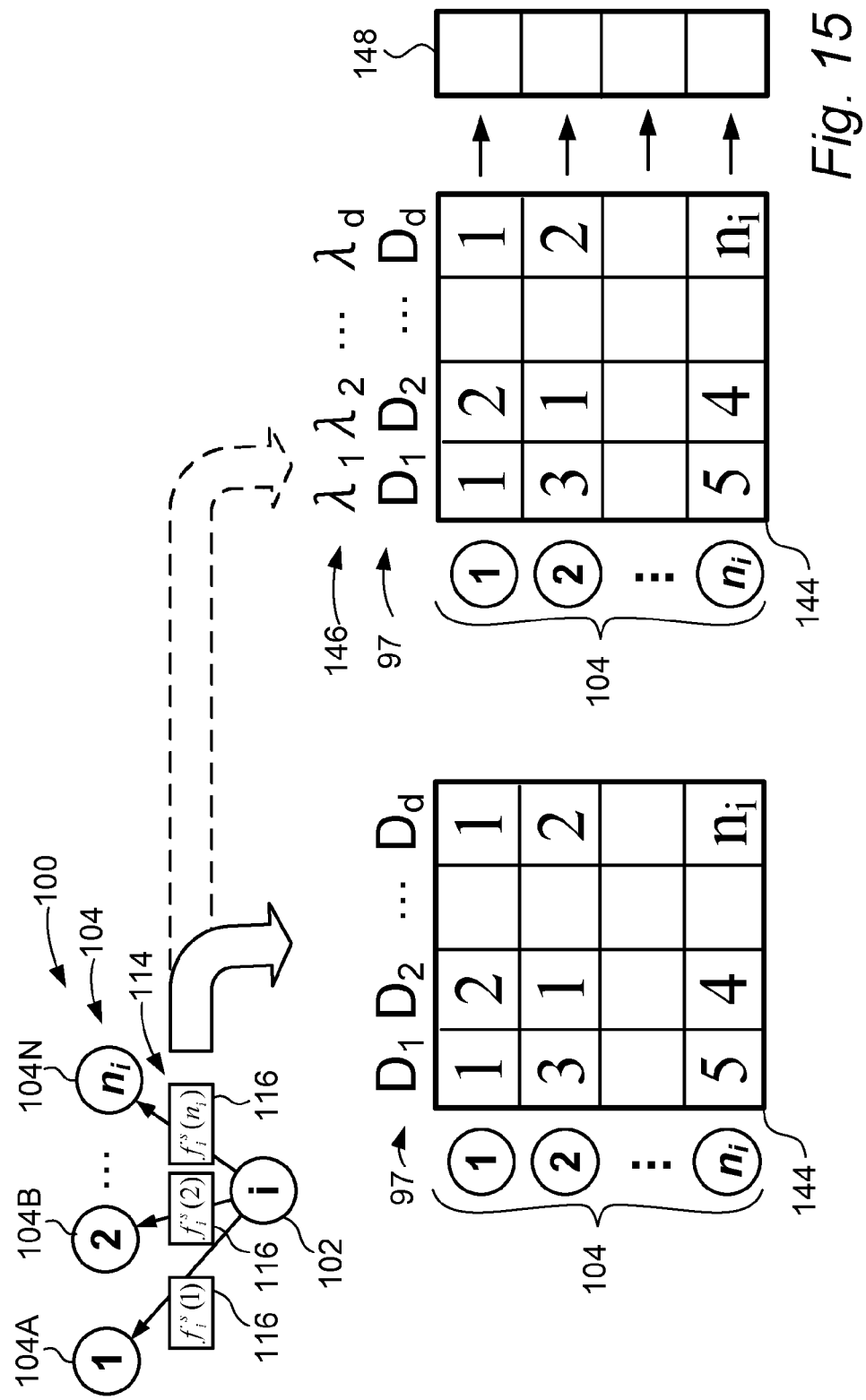
FIG. 15 is a block diagram of an example of a rank aggregation process using Borda Count ranking rule in accordance with the principles of the present inventions.

Referring now also to FIG. 15, for a given node 102 with neighbors 104, each data source 97 may yield a distribution 114 that includes a probability value 116 or weight associated with each neighbor 104. Within each distribution 114, placing neighbors 104 in order by probability value 116 ranks neighbors 104 in preference order. Rank matrix 144 may record points awarded according to preference order for each distribution 114 (or data source 97). Total points across all distributions 114 yields a numerical score for each neighbor 104, and sorting by total points identifies a preference order among neighbors 104. For example, the top-scoring neighbor 104 may indicate the neighbor 104 with the strongest composite affinity to given user 102 based on the aggregated distributions 114.

In an embodiment, BC point totals may be summed without weighting, for example, to treat every distribution 114 equally in the BC voting process. In another embodiment, points from one or more distributions 114 may be adjusted by weight values 146 applied to the associated probability values and/or point values, then summed to produce weighted Borda scores 148. For example, a particular data source 97 may be known to be salient to the SNA task at hand. Multiplying the point value for that data source 97 by a relatively large weight value 146 may increase the impact of that data source 97, for example, to reduce the risk of diluting the signal from the salient data source 97.

In an embodiment, the process of evaluating a relative importance value of each data source 97 may be combined with the process of aggregating rank of each data source 97. For example, for a particular SN analysis task, it may be known that certain neighbors 104 of given node 102 must be removed from (or retained within) signature graph 112. This analytics-specific constraint may be folded into a learning problem that computes relative importance values of data sources 97 as well as aggregated ranking as one single optimization problem.

For example, for every given node 102 (node i), define a new random variable $R_i$, for example, as shown in the equation below.

$$R_i = \sum_{s=1}^{d} \lambda_s R_i^s$$

$$\text{where } \sum_{s=1}^{d} \lambda_s = 1; 0 \leq \lambda_s \leq 1$$

The distribution of the random variable may be given by:

$$\langle f_i(1), f_i(2), \ldots, f_i(n_i) \rangle$$

A probability distribution $f_i^s(\cdot)$ over neighbors 104 of given node 102 (node i) naturally induces a ranking of neighbors 104 where neighbors 104 are simply ranked by the corresponding probability value. Such a ranking may be denoted by rank $(f_i^s)$.

For this, assume that $N(i,\lambda,e)$ denotes the set of neighbors 104 selected by an unsupervised algorithm when aggregated ranking is rank $(f_i)$.

Next define empirical loss l for every node i such that $l(i,\lambda,e)$ equals the number of differences in set $N(i,\lambda,e)$ from the training data. A supervised learning problem then can be posed as shown in the equation below.

$$\min_{\lambda} \sum_{i \in V} l(i, \lambda, e)$$

$$\text{s.t.} \sum_{s=1}^{d} \lambda_s = 1; 0 \le \lambda_s \le 1$$

Solving the above equation yields a relative importance weight vector (lambda) that can be used for computing aggregated ranking.

A SN 80 may have many users 82, many connections 84, and a large volume of communications 68. A network graph 90 that represents an entire SN 80 therefore may have many nodes 92, many links 94, and a large flux of dynamic trace data 96. Attempting to emulate or simulate a full-size SN 80 may trigger practical issues relating to execution speed and/or financial cost. A model 110 that includes a network graph 90 or neighbor graph 100 preferably returns a near-real-time result and runs on a practical, economical SNA system 78. The computational burden of a full-scale emulation may delay results and/or force the use of expensive computational resources.

One way to reduce execution time and/or equipment cost is to reduce the computational complexity of model 110. One way to reduce complexity may be to reduce the number of data sources 97, for example, by selecting data sources 97 based on a relative importance value. Another way to reduce complexity may be to reduce the number of emulated links 94. Generating a signature graph 112 may include a pruning or sparsification step that may retain and/or remove selected links 94. Pruning preferably should avoid skewing signature graph 112—and the behavior of model 110 that includes graph 112—away from the behavior of the modeled SN 80. Avoiding skewing may include, for example, proportionally retaining strong links 94 and/or removing weak links 94. A pruned network graph 90 or neighbor graph 100 may be a signature graph 112.

Figure 16:
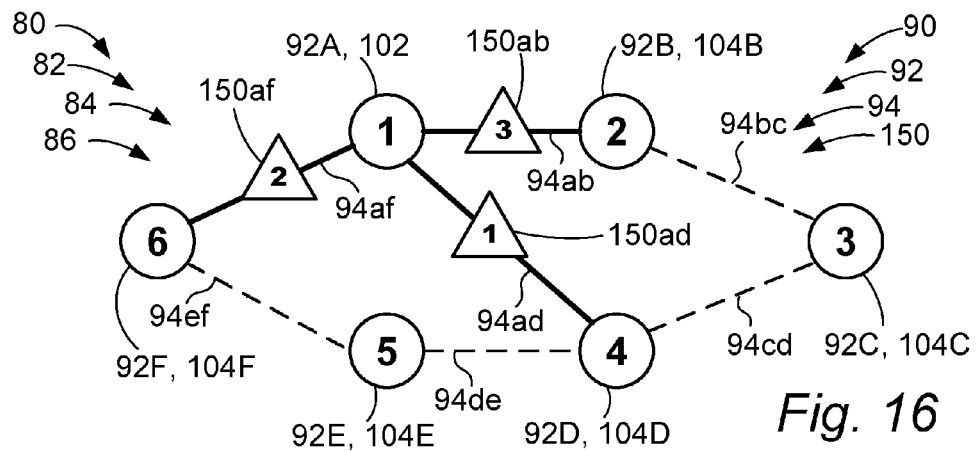
FIG. 16 is a block diagram of an example a SN represented as a network graph that includes a rank score or rank value associated with each connection in accordance with the principles of the present inventions.
Figure 17:
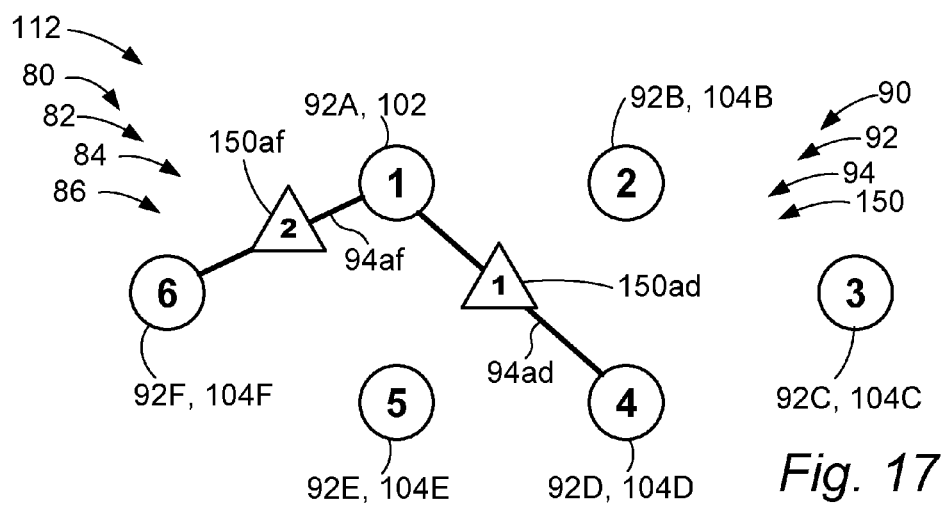
FIG. 17 is a block diagram of an example of signature graph in accordance with the principles of the present inventions.

Referring now also to FIGS. 16 and 17, a signature graph 112 may be a portion of a network graph 90 after removing selected links 94. The illustrative network graph 90 of FIG. 16, for example, includes aggregated rank values 150 associated with links 94. Link 94ad, for example, has an associated rank value 150ad, ranked (1); link 94af has an associated rank value 150af, ranked (2), and link 94ab has an associated rank value 150ab, ranked (3). In signature graph 112 of FIG. 17, link 94ab of node 102 has been removed. Signature graph 112 is smaller and simpler than the full network graph 90, and a model 110 that includes signature graph 112 may run faster on a given SNA system 78 than a model 110 that instead includes the full network graph 90.

In an embodiment, pruning may remove links 94 by applying a threshold function. For example, pruning may remove all links 94 ranked below a specified threshold value, such as, an aggregated rank value. A threshold value may be a count ("remove all below a given position") or a score ("remove all below a given value"). Counts, positions, and/or scores may be or may derive from aggregated ranking (including scores and preference order) determined by, for example, a KY or BC ranking rule. A higher specified threshold value may prune links 94 more aggressively, reducing the size of signature graph 112, potentially reducing its execution time, and potentially increasing its error with respect to the modeled SN 80. A lower threshold value may prune links 94 less aggressively, yielding a larger and potentially slower and/or more accurate graph 112.

In an embodiment, pruning may remove links 94 by random sampling. For example, each link 94 may face some specified chance of being removed from network graph 90, so that each link 94 has an equal risk of deletion. A 50-50 coin-flip applied to each link 94, for example, may cut network graph 90 substantially in half. Pruning by random selection may reduce the risk of biasing or skewing graph 112 and any related model 110. Increasing or decreasing a chance value applied during sampling may allow control over the amount of compression achieved during pruning.

In an embodiment, pruning may remove links by statistical sampling. For example, a pruning process may remove or retain links 94 such that the probability of removing or retaining a link 94 from a given node 102 to a neighboring node 104 is proportional to the rank of that link 94. The rank value may be, for example, an aggregated rank score or position determined by a KY or BC ranking rule. In an embodiment, a statistical sampling method may, for every node i, retain its $[\deg(i)]^e$ number of top-most ranked neighboring links (edges) in the final aggregated ranked list where $0 \le e \le 1$. In an embodiment, the parameter e may be learned by a grid search method. A sampling that discards more links 94 may achieve a higher compression ratio than a sampling that discards fewer links 94. In an embodiment, a desired compression ratio may govern the number of links 94 removed.

Increasing the compression ratio may increase the error of graph 112 with respect to the modeled SN 80. In an embodiment, a link-pruning process may include measuring or monitoring one or more error values, for example, to evaluate the effect of removing links 94 and/or control the number or percentage removed. For example, specifying an acceptable maximum error level may allow a pruning process to automatically seek the smallest signature graph 112 within the acceptable error and may facilitate finding values for parameters that influence graph 112 or model 110. An LTR algorithm 120, for example, may include parameters that influence its machine-learning process, and monitoring an acceptable error may facilitate setting these parameters. An error value may include a measurement taken from a network graph 90 and from a corresponding signature graph 112, for example, to calculate a difference value that measures an error.

Figure 18:
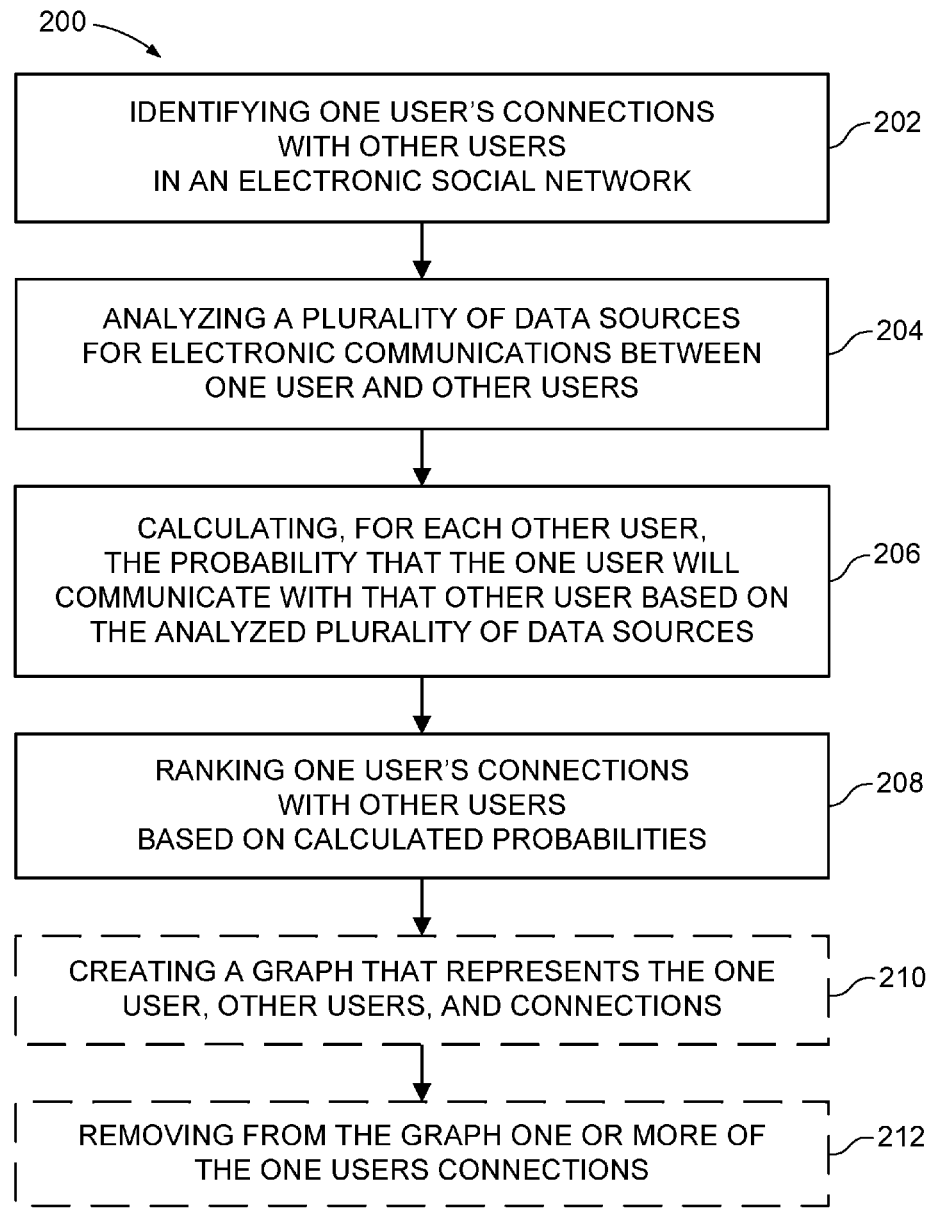
FIG. 18 depicts an example of a method of discovering or generating a signature graph in accordance with the principles of the present inventions.

Referring now also to FIG. 18, a method 200 for ranking one user's connections in an electronic social network may include identifying one user's connections with other users in an electronic SN, at 202. The method may additionally include analyzing a plurality of data sources for electronic communications between the one user and the other users, at 204. The method may further include calculating, for each of the other users, the probability that the one user will communicate with that other user based on the analyzed plurality of data sources, at 206. The method additionally includes ranking the one user's connections with the other users based on the calculated probabilities, at 208. Method 200 may include other, alternative, or additional elements; may omit one or more elements; and/or may follow a different sequence of elements from that listed.

Identifying one user's connections at 202 may include selecting one user 82 (given user 102) for analysis. A selection may occur by applying any criterion or criteria to users 82 of SN 80. Criteria may include arbitrary selection, random selection, and/or human choice; selecting a user 82 according to the presence or absence one more features, characteristics, and/or attributes; the submission of a query to a database of users 82; and so on. Additionally, identifying one user's connections at 202 may include identifying, for the selected user 82, connections 84 (links 94) of the selected user 82 to other users 82 (neighbors 104) in SN 80. Moreover, identifying one user's connections at 202 may include looking up in registry 74 indicia that identify a set of connected other users 82. If selected user 82 has zero connections 84, or if selected user 82 is a system, external, or other designated user 82, then identifying one user's connections at 202 may include rejecting selected user 82 and selecting another user 82.

After analyzing a first selected user 82, method 200 may return to identifying at 202 to select a second or subsequent user 82 and node 102. When selecting a second or subsequent user 82, identifying one user's connections at 202 may include selecting next the second or subsequent user 82 from the other users (neighbors 104) of the first selected user 82. The process of generating a SN model 110 may ultimately iterate or some or all first-degree neighbors 104 of the first selected user 82, and to some or all second- and subsequent-degree neighbors 104, and potentially to all users 82 of SN 80.

Analyzing a plurality of data sources at 204 may include identifying link-structure data 86 and/or trace data 96 associated with selected user 82 (given node 102) and/or each user 82 of the set of other connected users 82 (neighbors 104). Analyzing a plurality of data sources at 204 may include, for each one user 82 of interest, making copies of (or references to) associated registry 74 data, link-structure data 86, and/or trace data 96, for example, to isolate the SN analysis process from the live data of SN 80 and system 60.

Analyzing a plurality of data sources at 204 may include selecting one or more data sources 97 of interest in link-structure data 86 and/or trace data 96. Selecting data sources 97 may include selection by one or more criteria, features, or attributes. Examples of criteria may include "data sources 97 that include communications 68 sent via website 70 to a specified user 82 on a specified date" or "data sources 97 that include communications 68 sent by a first specified user 82 to a second specified user 82." For example, a SN analysis task may seek to capture data associated with a particular advertisement broadcast to users 82 in a particular region. The selection criterion accordingly may specify data sources 97 known to include records of that communication 68.

Analyzing a plurality of data sources at 204 may include, within all or selected data sources 97, selecting communications 68 of interest. Selected communications 68 may include communications 68 selected by one or more criteria, features, or attributes. An example of a criterion may include user identifiers associated with particular users 82. For example, a SN analysis task may seek to extract from trace data 96 of the one user 82 (node 102) communications 68 sent to or received by one or more specified neighbors 104. Analyzing a plurality of data sources at 204 accordingly may include selecting communications 68 sent by given node 102 to each neighbor 104, or sent by each neighbor 104 to given node 102, for example, to characterize communications 68 within the associated neighbor graph 100.

For example, if a SN analysis goal is to identify users 82 at risk of quitting SN 80, then each user's history of breaking connections 84 may be known to be salient and selected as a data source 97. For example, if a SN analysis goal is to identify users 82 who anticipate trends, then communications 68 that eventually pass to distant connections 84 may be known to be salient and selected as a data source 97. Selected data sources 97 may include data sources 97 not known salient, for example, to allow the SN analysis process to detect important data sources, for example, as a result of the application of machine-learning, automated ranking, statistical sampling, and/or clustering techniques.

Analyzing a plurality of data sources at 204 may further include weighting electronic communication data from each data source 97. For example, each data source 97 may differ in salience or importance with respect to the SNA task. A weight value associated with each data source 97 may provide a mechanism for adding or reducing emphasis on each data source 97 when generating and/or evaluating a signature graph 112, for example, to compensate for differences in salience or importance. Analyzing a plurality of data sources at 204 may include associating a weight parameter with a data source 97, assigning a weight value to each weight parameter, and considering the weight value as a factor in calculations that include the data source 97. Each data source 97 accordingly may have an associated weight parameter and value. In an embodiment, analyzing a plurality of data sources at 204 may include assigning a value to each weight parameter based on a relative importance value (rank score and/or rank position) assigned to the associated data source 97. For example, a large relative importance value may map to a large weight value, so that an important data source 97 receives increased emphasis within signature graph 112.

Calculating probability at 206 may include, for a selected user 82 (given user 102) and data source 97, inducing a probability distribution 114 with respect to the other users 82 (neighbors 104) connected to selected user 82. In an embodiment, inducing a distribution may include learning a distribution 114 via a learning-to-rank (LTR) algorithm 120, which may generate a learned ranking function that may be or may approximate a probability distribution function. In an embodiment, LTR algorithm 120 may include a maximum likelihood base learning rule.

In an embodiment, calculating probability at 206 may include assigning a relative importance value to each data source 97 of the plurality of data sources 97. Assigning a relative importance value may include calculating a distance, difference, or divergence measure between each distribution 114 induced from a data source 97 and a measured, estimated, or hypothetical probability distribution 124 selected or prepared as a standard of comparison. Calculating a distance, difference, or divergence measure may include calculating a Kullback-Leibler divergence value, for example, to measure the divergence between each distribution and the standard of comparison. Distance, difference, or divergence values, each associated with a distribution and ultimately with a data source 97, may be used to rank distributions and therefore associated data sources 97 relative to the standard of comparison. Calculating probability at 206 may include using a rank score and/or rank position of a data source 97 to measure and/or indicate the relative importance of the data source 97. Calculating probability at 206 may include using relative importance values (scores and/or positions) to select one or more data sources 97, for example, to include or exclude selected data sources 97 from other processing of method 200. This selection may include selecting data sources 97 above or below a specified threshold relative importance value (a score and/or position). This selection may include selecting data sources 97 in proportion to relative importance values, for example, retain a sample of data sources 97 that proportionately includes data sources 97 over a specified range of relative importance values.

Calculating probability at 206 may further include calculating, for each of the other users 82 (neighbors 104), the probability that the one user 82 (node 102) will communicate with the other user 82 based on a subset of the analyzed data sources 96, the subset excluding one or more data sources with a relative importance value below a predetermined threshold importance value. Increasing (or decreasing) the predetermined or specified threshold value may increase (or decrease) the number of data sources 97 included in graph 112. Increasing the number of data sources 97 may increase the computational complexity of graph 112, reducing execution speed—and may also increase the accuracy of graph 112 as a result of including more data at lower importance values. Similarly, decreasing the number of data sources 97 may reduce computational complexity, increase execution speed, and potentially reduce accuracy by excluding a larger number of data sources 97 at higher importance values. For example, a given SN analysis task may require a near-real-time response from graph 112 may specify a high threshold to limit the number of data sources 97 and favor a faster response.

Calculating probability at 206 may further include calculating, for each of the other users 82 (neighbors 104), the probability that the one user 82 (node 102) will communication with the other user 82 based on the weighted electronic communications data from each data source 97. A weight 99 may be a quantity, coefficient, parameter, or other value associated with a data source 97, for example, to capture differences in importance or rank among data sources 97 when generating graph 112.

Ranking connections at 208 may include obtaining, for one user 82 (node 102) and connected other users 82 (neighbors 104), a probability distribution 114, for example, via calculating probability at 206. Ranking connections at 208 may include aggregating probability values 116 of distributions 114 (each associated with a data source 97) to obtain a score value for each connection 84, and thereby for each user 82 (neighbor 104). Sorting connections 84 by score values ranks connections 84 and therefore associated neighbors 104 in order by score. High scores may identify connections 84 (neighbors 104) with high relative importance, and low scores may identify connections 84 (neighbors 104) with low relative importance.

In an embodiment, ranking connections at 208 may employ a Kemeny-Young rule to aggregate probability values 116 and evaluate a score value for each connection 82. In an embodiment, ranking connections at 208 may employ a Borda Count rule to aggregate values 116 and evaluate score values. In an embodiment, ranking connections at 208 may employ a weighted Borda Count rule to aggregate values and evaluate weighted scores.

In some embodiments, method 200 may further include creating a graph that represents the one user, other users, and the one user's connections with other users at 210. Creating a graph at 210 may include creating a neighbor graph 100 that represents the selected user 82 as a given node 102, each connected other user 82 as a neighbor node 104, and each connection 84 between the selected user 82 and a connected other user as a link 94. Creating a neighbor graph 100 may include implementing the neighbor graph 100 in computer program code.

In some embodiments, method 200 may further include removing from the graph one or more of the one user's connections based on the ranked one user's connections at 212. In an embodiment, removing connections at 212 may include applying a threshold function, for example, to remove or retain connections above or below a specified rank score, rank position, or other specified value. Rank score and/or position values may derive from aggregated ranking obtained by a method that may include a Kemeny-Young or Borda Count ranking rule. In an embodiment, removing connections at 212 may include removing connections 84 by random sampling. In an embodiment, removing connections at 212 may include removing connections 84 by statistical sampling, for example, to remove connections in proportion to rank score or rank position, so that the probability of retaining a connection is proportional to its rank in an aggregated ranking obtained by a method that may include a Kemeny-Young or Borda Count ranking rule. Removing connections at 212 may include specifying one or more parameters that influence the number of connections removed or retained. Removing connections at 212 may include measuring or monitoring one or more error values, for example, to evaluate the effect of removing connections 84 and/or control the number or percentage removed.

A computational model 110 that includes neighbor graph 100 may function as, for example, a proxy of all or part of an actual SN 80, for example, to predict the behavior of a modeled SN 80 by testing a change, communication, or other stimulus with the SN model 110.

As should be appreciated, the preceding embodiment(s) is/are for illustrative purposes only. In embodiments, steps may be added or removed, and many steps may be performed at least partly in parallel. Different portions of a digital file, or different related digital files may be processed at the same time or prioritized for speed or transfer purposes. Processes such as searching for multiple patterns within arrays may be performed effectively or actually simultaneously. For example, some or all processes may be threaded, using a single processor or multiple processors.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the embodiments in the form disclosed. Many modifications and variations will be apparent to those of ordinary skill in the art without departing from the scope and spirit of the embodiments of the disclosure. The embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
    identifying, by an electronic apparatus, one user's connections with other users in an electronic social network;
    creating, by the electronic apparatus, a data structure in a memory that represents the one user, the other users, and the one user's connections with the other users;
    analyzing, by the electronic apparatus, a plurality of data sources for electronic communications between the one user and the other users including assigning a relative importance value to each data source of the plurality of data sources and assigning a weight to each of the connections between the one user and the other users, wherein the weight is an encoded value computed based on a link structure of the connections, the link structure including metadata indicating a category and a status of a respective connection(s), the weight enabling an emulation and behavioral prediction of the electronic social network in response to a stimulus applied to the electronic social network;

calculating, by the electronic apparatus, for each of the other users a probability that the one user will communicate with that other user based on the analyzed plurality of data sources;

ranking, by the electronic apparatus, the one user's connections with the other users based on the calculated probabilities;

removing from the data structure one or more data structure elements of the one user's connections based on the ranked one user's connections to create a signature graph; and forming a diagnostic model of the electronic social network, the diagnostic model including the signature graph to accelerate a processing speed of the diagnostic model on a social network analysis system.

2. The method of claim 1, wherein creating, by the electronic apparatus, the data structure includes creating a graph that represents the one user, the other users, and the one user's connections with the other users.

3. The method of claim 2, further comprising removing from the graph, by the electronic apparatus, one or more of the one user's connections based on the ranked one user's connections.

4. The method of claim 3, wherein removing from the graph, by the electronic apparatus, one or more of the one user's connections based on the ranked one user's connections includes removing from the graph, by the electronic apparatus, one or more of the one user's connections that are ranked lower than a predetermined threshold ranking.

5. The method of claim 1, wherein calculating, by the electronic apparatus, for each of the other users the probability that the one user will communicate with that other user based on the analyzed plurality of data sources includes calculating, by the electronic apparatus, for each of the other users the probability that the one user will communicate with that other user based on a subset of the analyzed plurality of data sources, the subset excluding one or more data sources with the relative importance value below a predetermined threshold importance value.

6. The method of claim 1, wherein analyzing, by the electronic apparatus, the plurality of data sources for electronic communications between the one user and the other users further includes weighting, by the electronic apparatus, electronic communications data from each data source of the plurality of data sources based on the relative importance value assigned to each data source.

7. The method of claim 6, wherein calculating, by the electronic apparatus, for each of the other users the probability that the one user will communicate with that other user based on the analyzed plurality of data sources includes calculating, by the electronic apparatus, for each of the other users the probability that the one user will communicate with that other user based on the weighted electronic communications data from each data source.

8. A method, comprising:
identifying, by an electronic apparatus, one user's connections with other users in an electronic social network;

creating, by the electronic apparatus, a network graph data structure in a memory that represents the one user, the other users, and the one user's connections with the other users;

assigning a weight to each of the connections between the one user and the other users, wherein the weight is an encoded value computed based on a link structure of the connections, the link structure including metadata indicating a category and a status of a respective connection(s), the weight enabling an emulation and behavioral prediction of the electronic social network in response to a stimulus applied to the electronic social network;

analyzing, by the electronic apparatus, a plurality of data sources for electronic communications between the one user and the other users;

calculating, by the electronic apparatus, for each of the other users a probability that the one user will communicate with that other user based on the analyzed plurality of data sources;

ranking, by the electronic apparatus, the one user's connections with the other users based on the calculated probabilities;

removing from the network graph data structure, by the electronic apparatus, one or more data structure elements of the one user's connections based on the ranked one user's connections to create a signature graph; and forming a diagnostic model of the electronic social network, the diagnostic model including the signature graph to accelerate a processing speed of the diagnostic model on a social network analysis system.

9. The method of claim 8, wherein removing from the network graph data structure, by the electronic apparatus, one or more of the one user's connections based on the ranked one user's connections includes removing from the network graph data structure, by the electronic apparatus, one or more of the one user's connections that are ranked lower than a predetermined threshold ranking.

10. The method of claim 8, wherein:
analyzing, by the electronic apparatus, the plurality of data sources for electronic communications between the one user and the other users includes assigning a relative importance value to each data source of the plurality of data sources; and wherein calculating, by the electronic apparatus, for each of the other users the probability that the one user will communicate with that other user based on the analyzed plurality of data sources includes calculating, by the electronic apparatus, for each of the other users the probability that the one user will communicate with that other user based on a subset of the analyzed plurality of data sources, the subset excluding one or more data sources with the relative importance value below a predetermined threshold importance value.

11. The method of claim 8, wherein analyzing, by the electronic apparatus, the plurality of data sources for electronic communications between the one user and the other users further includes weighting, by the electronic apparatus, electronic communications data from each data source of the plurality of data sources based on the relative importance value assigned to each data source.

12. The method of claim 11, wherein calculating, by the electronic apparatus, for each of the other users the probability that the one user will communicate with that other user based on the analyzed plurality of data sources includes calculating, by the electronic apparatus, for each of the other users the probability that the one user will communicate with that other user based on the weighted electronic communications data from each data source.

* * * * *